(12) United States Patent
Ott et al.

(10) Patent No.: US 10,642,975 B2
(45) Date of Patent: May 5, 2020

(54) SYSTEM AND METHODS FOR AUTOMATICALLY DETECTING DECEPTIVE CONTENT

(71) Applicant: CORNELL UNIVERSITY, Ithaca, NY (US)

(72) Inventors: Myle Ott, Ithaca, NY (US); Yejin Choi, Westbury, NY (US); Claire Cardie, Ithaca, NY (US); Jeffrey Hancock, Ithaca, NY (US)

(73) Assignee: Cornell University, Ithaca, NY (US)

( * ) Notice: Subject to any disclaimer, the term of this patent is extended or adjusted under 35 U.S.C. 154(b) by 525 days.

(21) Appl. No.: 14/352,350

(22) PCT Filed: Oct. 18, 2012

(86) PCT No.: PCT/US2012/060862
§ 371 (c)(1),
(2) Date: Apr. 17, 2014

(87) PCT Pub. No.: WO2013/059487
PCT Pub. Date: Apr. 25, 2013

(65) Prior Publication Data
US 2014/0304814 A1    Oct. 9, 2014

Related U.S. Application Data

(60) Provisional application No. 61/548,865, filed on Oct. 19, 2011.

(51) Int. Cl.
*G06F 21/00* (2013.01)
*G06F 21/55* (2013.01)
*G06F 17/27* (2006.01)

(52) U.S. Cl.
CPC ......... *G06F 21/552* (2013.01); *G06F 17/274* (2013.01); *G06F 2221/034* (2013.01)

(58) Field of Classification Search
None
See application file for complete search history.

(56) References Cited

U.S. PATENT DOCUMENTS 6,470,307 B1 * 10/2002 Turney ............... G06F 17/3061
704/9
7,529,719 B2 * 5/2009 Liu .................. G06F 17/30705
706/29

(Continued)

OTHER PUBLICATIONS

Cavnar et al. "N-gram-based text categorization," Ann Arbor MI 48113.2: 161-175 (1994).*

(Continued)

*Primary Examiner* — Hien D Khuu
(74) *Attorney, Agent, or Firm* — Valauskas Corder LLC

(57) ABSTRACT

Systems and methods for detecting deceptive opinion spam. Certain embodiments include a classifier with improved accuracy for detecting deceptive opinion entries. A feature analysis of learned models reveals a relationship between deceptive opinions and imaginative writing. By modeling deception in a generative framework, the prevalence of deception in two popular online review communities may be determined. Deceptive opinion spam is a rapidly growing and widespread problem, especially in review communities with minimal posting requirements.

6 Claims, 22 Drawing Sheets

(56) References Cited

U.S. PATENT DOCUMENTS

| | | | | |
|---|---|---|---|---|
| 7,921,063 B1* | 4/2011 | Quinlan | G06F 17/20 | 705/76 |
| 8,379,830 B1* | 2/2013 | Naik | H04M 3/493 | 379/265.02 |
| 8,516,100 B1* | 8/2013 | Oliver | H04L 51/12 | 709/203 |
| 2007/0010993 A1* | 1/2007 | Bachenko | G06F 17/274 | 704/9 |
| 2007/0265803 A1* | 11/2007 | Kotsovinos | G06Q 30/02 | 702/182 |
| 2009/0157813 A1* | 6/2009 | Jung | A61B 5/04842 | 709/204 |
| 2009/0165128 A1* | 6/2009 | McNally | G06Q 10/063 | 726/21 |
| 2009/0265304 A1* | 10/2009 | Ait-Mokhtar | G06F 16/30 | |
| 2010/0228656 A1* | 9/2010 | Wasserblat | G06Q 10/10 | 705/35 |
| 2011/0125734 A1* | 5/2011 | Duboue | G09B 7/00 | 707/723 |
| 2011/0135166 A1* | 6/2011 | Wechsler | G06K 9/00288 | 382/118 |
| 2012/0078826 A1* | 3/2012 | Ferrucci | G06N 7/005 | 706/12 |
| 2012/0209795 A1* | 8/2012 | Glickman | G06Q 30/0201 | 706/12 |
| 2012/0254333 A1* | 10/2012 | Chandramouli | G06F 17/27 | 709/206 |
| 2012/0317046 A1* | 12/2012 | Myslinski | G06Q 10/10 | 705/329 |
| 2013/0046531 A1* | 2/2013 | Chandramouli | G06F 17/2715 | 704/9 |
| 2013/0138428 A1* | 5/2013 | Chandramouli | G06F 17/274 | 704/9 |
| 2014/0298460 A1* | 10/2014 | Xue | H04L 63/1425 | 726/23 |
| 2014/0304814 A1* | 10/2014 | Ott | G06F 17/274 | 726/22 |
| 2015/0254566 A1* | 9/2015 | Chandramouli | G06F 17/27 | 706/11 |
| 2018/0012127 A1* | 1/2018 | Bilu | G06F 17/279 | |

OTHER PUBLICATIONS

Jindal et al., "Opinion spam and analysis," In Proceedings of the international conference on Web search and web data mining, pp. 219-230. ACM. 2008.*

* cited by examiner

| Time spent $t$ (minutes) | |
|---|---|
| All submissions | count: 400<br>$t_{min}$: 0.08, $t_{max}$: 29.78<br>$\bar{t}$: 8.06, $s$: 6.32 |

| Length $\ell$ (words) | |
|---|---|
| All submissions | $\ell_{min}$: 25, $\ell_{max}$: 425<br>$\bar{\ell}$: 115.75, $s$: 61.30 |
| Time spent $t < 1$ | count: 47<br>$\ell_{min}$: 39, $\ell_{max}$: 407<br>$\bar{\ell}$: 113.94, $s$: 66.24 |
| Time spent $t \geq 1$ | count: 353<br>$\ell_{min}$: 25, $\ell_{max}$: 425<br>$\bar{\ell}$: 115.99, $s$: 60.71 |

FIG. 2

|  |  | Accuracy | TRUTHFUL | | | DECEPTIVE | | |
|---|---|---|---|---|---|---|---|---|
|  |  |  | P | R | F | P | R | F |
| HUMAN | JUDGE 1 | 61.9% | 57.9 | 87.5 | 69.7 | 74.4 | 36.3 | 48.7 |
|  | JUDGE 2 | 56.9% | 53.9 | 95.0 | 68.8 | 78.9 | 18.8 | 30.3 |
|  | JUDGE 3 | 53.1% | 52.3 | 70.0 | 59.9 | 54.7 | 36.3 | 43.6 |
|  | MAJORITY | 58.1% | 54.8 | 92.5 | 68.8 | 76.0 | 23.8 | 36.2 |
| META | SKEPTIC | 60.6% | 60.8 | 60.0 | 60.4 | 60.5 | 61.3 | 60.9 |

FIG. 3

| Approach | Features | Accuracy | TRUTHFUL | | | DECEPTIVE | | |
|---|---|---|---|---|---|---|---|---|
| | | | P | R | F | P | R | F |
| GENRE IDENTIFICATION | $POS_{SVM}$ | 73.0% | 75.3 | 68.5 | 71.7 | 71.1 | 77.5 | 74.2 |
| PSYCHOLINGUISTIC DECEPTION DETECTION | $LIWC_{SVM}$ | 76.8% | 77.2 | 76.0 | 76.6 | 76.4 | 77.5 | 76.9 |
| TEXT CATEGORIZATION | $UNIGRAMS_{SVM}$ | 88.4% | 89.9 | 86.5 | 88.2 | 87.0 | 90.3 | 88.6 |
| | $BIGRAMS^{\dagger}_{SVM}$ | 89.6% | 90.1 | 89.0 | 89.6 | 89.1 | 90.3 | 89.7 |
| | $LIWC+BIGRAMS^{\dagger}_{SVM}$ | 89.8% | 89.8 | 89.8 | 89.8 | 89.8 | 89.8 | 89.8 |
| | $TRIGRAMS^{\dagger}_{SVM}$ | 89.0% | 89.0 | 89.0 | 89.0 | 89.0 | 89.0 | 89.0 |
| | $UNIGRAMS_{NB}$ | 88.4% | 92.5 | 83.5 | 87.8 | 85.0 | 93.3 | 88.9 |
| | $BIGRAMS^{\dagger}_{NB}$ | 88.9% | 89.8 | 87.8 | 88.7 | 88.0 | 90.0 | 89.0 |
| | $TRIGRAMS^{\dagger}_{NB}$ | 87.6% | 87.7 | 87.5 | 87.6 | 87.5 | 87.8 | 87.6 |
| HUMAN / META | JUDGE 1 | 61.9% | 57.9 | 87.5 | 69.7 | 74.4 | 36.3 | 48.7 |
| | JUDGE 2 | 56.9% | 53.9 | 95.0 | 68.8 | 78.9 | 18.8 | 30.3 |
| | SKEPTIC | 60.6% | 60.8 | 60.0 | 60.4 | 60.5 | 61.3 | 60.9 |

FIG. 4

| TRUTHFUL/INFORMATIVE | | | DECEPTIVE/IMAGINATIVE | | |
|---|---|---|---|---|---|
| Category | Variant | Weight | Category | Variant | Weight |
| NOUNS | Singular | 0.008 | VERBS | Base | -0.057 |
| | Plural | 0.002 | | Past tense | 0.041 |
| | Proper, singular | -0.041 | | Present participle | -0.089 |
| | Proper, plural | 0.091 | | Singular, present | -0.031 |
| ADJECTIVES | General | 0.002 | | Third person singular, present | 0.026 |
| | Comparative | 0.058 | | Modal | -0.063 |
| | Superlative | -0.164 | ADVERBS | General | 0.001 |
| PREPOSITIONS | General | 0.064 | | Comparative | -0.035 |
| DETERMINERS | General | 0.009 | PRONOUNS | Personal | -0.098 |
| COORD. CONJ. | General | 0.094 | | Possessive | -0.303 |
| VERBS | Past participle | 0.053 | PRE-DETERMINERS | General | 0.017 |
| ADVERBS | Superlative | -0.094 | | | |

FIG. 5

| LIWC+BIGRAMS$^+_{SVM}$ | | LIWC$_{SVM}$ | |
|---|---|---|---|
| TRUTHFUL | DECEPTIVE | TRUTHFUL | DECEPTIVE |
| ! | chicago | hear | i |
| ... | my | number | family |
| on | hotel | allpunct | perspron |
| location | _and | negemo | see |
| ) | luxury | dash | pronoun |
| allpunct$_{LIWC}$ | experience | exclusive | leisure |
| floor | hilton | we | exclampunct |
| ( | business | sexual | sixletters |
| the_hotel | vacation | period | posemo |
| bathroom | i | otherpunct | comma |
| small | spa | space | cause |
| helpful | looking | human | auxverb |
| $ | while | past | future |
| hotel_ | husband | inhibition | perceptual |
| other | my_husband | assent | feel |

SYSTEM AND METHODS FOR AUTOMATICALLY DETECTING DECEPTIVE CONTENT

PRIORITY CLAIM

This application claims the benefit of U.S. Provisional Application No. 61/548,865 filed Oct. 19, 2011.

STATEMENT CONCERNING FEDERALLY SPONSORED RESEARCH

This invention was made with U.S. government support under grants BCS-0624277, BCS-0904822, HSD-0624267, IIS-0968450, and NSCC-0904822 awarded by the National Science Foundation. The U.S. government has certain rights in the invention.

FIELD OF THE INVENTION

The present invention relates generally to an automatic system and methods for detecting whether written material is truthful or deceptive.

BACKGROUND OF THE INVENTION

Review websites often feature user-generated opinions. Such review websites may permit a user to provide reviews for any type of service provider, including, for example, a restaurant, bar, hotel, transportation company (e.g., airline, train, livery service), shopping venue, spa and beauty service provider, health care provides or institution, house repair/maintenance service provider, automotive services, pet-related services, professional or financial services provider, religious organization, or other. Review websites also may be directed to certain types of products such as consumer products or industrial products, or may be directed to a business as a whole.

Review websites are generally open for any user to submit a review, and accordingly, are subject to abuse. Users sometimes generate inappropriate or fraudulent reviews, which are termed "opinion spam" for purposes of this application. Some users systematically generate opinion spam on one or more review websites for monetary gain.

Opinion spam can range from annoying self-promotion of an unrelated website or blog to deliberate review fraud. An example of deliberate review fraud may occur when a company hires people to write positive reviews for an otherwise poorly reviewed product. Although opinion spam may include a false positive review (as in the example), opinion spam also may be a false negative review, potentially in order to damage the reputation of a competitor.

Conventional methods for detecting and preventing spam are directed to email spam and Web spam. However, because of the many differences in email spam and web spam, such as delivery method and ease of recognition, compared to opinion spam, known methods are not easily adaptable to detecting opinion spam.

Apparatuses and procedures for detecting and preventing certain types of opinion spam have been developed. Specifically, such procedures are directed to detection of what is termed "disruptive opinion spam"—that is, non-review information entered into review fields. Examples of disruptive opinion spam include advertisements, questions, and other irrelevant or non-opinion text entered into review fields in review websites. Typically, a user would be able to easily identify disruptive opinion spam because, for example, it does not actually review a product or service. Accordingly, while the presence of disruptive opinion spam may be a nuisance, it poses a minimal risk to the user since the users can easily identify and ignore it.

Other known procedures for detecting opinion spam are configured to identify duplicate opinions. Such procedures are trained to assess the review text, reviewer identification, and product, to distinguish between duplicate opinions—considered opinion spam—and non-duplicate opinions—considered truthful. Duplicate or near-duplicate opinions are opinions that appear more than once in the corpus with the same or similar text. Duplicate opinions are likely to be deceptive. However, such procedures do not identify non-duplicative deceptive opinions.

Additional known procedures for detecting opinion spam incorporate analysis of psycholinguistic qualities of deceptive opinions. To study this phenomenon, participants are asked to give both their true and untrue views on personal issues (e.g., their stance on the death penalty). However, while these research studies compare psycholinguistic qualities of deceptive opinions to a random guess baseline of 50%, they fail to evaluate and compare any other computational and manual approaches.

Another known procedure may include manual analysis of a small dataset, e.g., 40 non-deceptive reviews and 42 deceptive reviews. In one approach, the psychologically relevant linguistic differences between the non-deceptive review and deceptive reviews are compared manually. In another approach, the dataset is manually reviewed for distortions in popularity rankings. Clearly, such manual analysis is time intensive and relatively subjective.

Lastly, automatic approaches to determining review quality, review helpfulness, and review credibility have been developed. However, most measurements employed in that determination are based exclusively on human judgments, which are subjective and poorly calibrated to detecting opinion spam.

There is a need for a system and methods to detect deceptive opinion spam that includes automatic and time-efficient assessment of reviews and that minimizes subjectivity. The present invention satisfies this demand.

SUMMARY OF THE INVENTION

For purposes of this application, the present invention is discussed in reference to detecting deceptive opinion spam in review websites, but the discussion is merely exemplary. The present invention is applicable to detecting deceptive opinion text content in any context.

Also, while embodiments of the present invention are discussed in reference to classifying opinion text as "deceptive" or "truthful", certain embodiments may be directed to other nuanced classifications such as "suspect", "false", "misleading", "fabricated", "fictitious", "unauthentic", "unreliable" compared to "reliable", "supportable", "certified", "authentic", "valid", or other relevant classification. Certain embodiments of the present invention are directed to non-binary classification systems where a number of classifications on the deceptive-truthfulness spectrum may be identified.

Certain embodiments of the present invention include a system and methods for detecting "deceptive opinion spam". For purposes of this application, the term "deceptive" is used to describe text that the writer believed was not accurate at the time of writing. For purposes of this application, the term "truthful" is used to describe text that the writer believed was accurate at the time of writing. For purposes of this application, the term "deceptive opinion spam" means a fictitious text that has been written with intent to sound authentic in order to deceive the reader. Deceptive opinion spam may include a false positive opinion, e.g., to promote or improve the reputation of one's own business or a false negative opinion, e.g., to disparage a competitor's business.

Deceptive opinion entries may be uploaded to review websites or otherwise disseminated through any publicly available forum known in the art. The present invention may be used to assess a dataset of opinion information at a forum and, by identifying and eliminating "deceptive" opinion entries, construct a generally genuine opinion dataset at the forum.

Certain method embodiments of a present invention may include the steps of collecting opinion information, analyzing the collected opinion information, generating a model for detecting deceptive opinion text based on the analysis, and applying the model to a new set of opinion information to detect deceptive opinion text. Each step is described in more detail below.

In certain embodiments, a present invention includes collecting opinion information, such as truthful and deceptive opinions. For purposes of this application, the term "opinion" means "a view or judgment formed about something". Also for purposes of this application, the term "opinion information" typically includes an opinion rendered in writing regarding a business, product, person, or other subject.

Opinion information is typically obtained from an information source. For purposes of this application, an information source may include a website, a survey administrator, a reviewer, a database, or other source of opinion information.

Opinion information may be collected in many forms. In certain embodiments, the information is collected as one opinion information entry, e.g., a single opinion regarding a single entity from a single reviewer rendered on one occasion. The information also may be collected as a group of opinion information entries from one source, e.g., more than one opinion of a single business from multiple reviewers, or more than one review of more than one businesses from a single reviewer, all from one source. In addition, the information may be collected as a group of opinion information entries from multiple sources, e.g., more than one review of a single business from more than one reviewer or more than one review of multiple businesses from multiple reviewers, each from multiple sources.

When collecting opinion information, additional information, such as source information, publication information, and truthful/deception characterization may be collected as well. The people rendering the opinion may characterize the opinion as truthful or deceptive such that the information may be coded according to the opiner's characterization. For example, two opinions are provided below. The first exemplary opinion would be coded as "truthful" and the second exemplary opinion would be coded as "deceptive".

EXAMPLE REVIEW 1. I have stayed at many hotels traveling for both business and pleasure and I can honestly stay that The James is tops. The service at the hotel is first class. The rooms are modern and very comfortable. The location is perfect within walking distance to all of the great sights and restaurants. Highly recommend to both business travellers and couples.

EXAMPLE REVIEW 2. My husband and I stayed at the James Chicago Hotel for our anniversary. This place is fantastic! We knew as soon as we arrived we made the right choice! The rooms are BEAUTIFUL and the staff very attentive and wonderful!! The area of the hotel is great, since I love to shop I couldn't ask for more!! We will definatly be back to Chicago and we will for sure be back to the James Chicago.

Clearly, such collected information provides labeled data for this research. After collection, the opinion information is analyzed. In certain embodiments, the collected information is used as a "training set" for a machine learning algorithm. In training, one or more statistical machine learning algorithm analyze the coded information and identify patterns among certain types (e.g., truthful or deceptive, some other scale of truthfulness, or some other quality of information) of information.

The analysis algorithms may be configured to conduct one or more types of automated analysis approaches for identifying patterns between entries. Specifically, the approaches may include: (a) a standard text categorization approach, in which n-gram-based classifiers are used to label opinions as either deceptive or truthful; (b) an psycholinguistic approach, in which deceptive statements are expected to exemplify the psychological effects of lying, such as increased negative emotion and psychological distancing; and (c) genre identification approach, in which deceptive and truthful writing is viewed as sub-genres of imaginative and informative writing, respectively.

The performance of each analysis approach and combinations of each approach may be evaluated for accuracy and compared. Particularly, n-gram-based text categorization techniques outperformed both machine-learning classifiers trained on features traditionally employed in (a) psychological studies of deception and (b) genre identification in certain embodiments directed to analyzing hotel reviews. Notably, a combined classifier with both n-gram and psychological deception features may achieve nearly 90% cross-validated accuracy on this task. In contrast, most human judges have difficulty assessing when an opinion is deceptive, since they perform roughly at a chance level of assessment—a finding that is consistent with decades of traditional deception detection research.

Analysis of the collected information reveals which features are associated with truthful opinions and which features are associated with deceptive opinions. From the feature information, a model is generated to predict whether a new opinion is deceptive or truthful. A model may include an improved algorithm, a combination of algorithms that incorporate more than one approach, or other.

Additionally, embodiments of the model generation step may include an examination of the feature weights learned by the machine learning classifiers. Specifically, the present invention sheds light on an ongoing debate in the deception literature regarding the importance of considering the context and motivation of a deception, rather than simply identifying a universal set of deception cues. It appears that liars have difficulty encoding spatial information.

Lastly, the study of deceptive opinion spam detection as a genre identification problem reveals relationships between deceptive opinions and imaginative writing, and between truthful opinions and informative writing.

The model then may be used to examine "new" opinion information, that is, opinion information other than that which may have been collected in earlier steps. An output of the present invention may include a display in which certain text is flagged as deceptive, a display in which statistics about prevalence of deceptive content within a dataset are identified, or a display that shows text after all the deceptive content has been removed or filtered out.

The present invention and its attributes and advantages may be further understood and appreciated with reference to the detailed description below of one contemplated embodiment, taken in conjunction with the accompanying drawing.

DESCRIPTION OF THE DRAWING

FIG. 2 illustrates a table of descriptive statistics gathered using an embodiment of according to the present invention.

FIG. 3 illustrates a table of judges' performance according to an embodiment of the present invention.

FIG. 4 illustrates a table of automated classifier performance according to an embodiment of the present invention.

FIG. 5 illustrates a table of average feature weights according to an embodiment of the present invention.

FIG. 6 illustrates a table of highest weighted truthful and deceptive features according to an embodiment of the present invention.

DETAILED DESCRIPTION OF THE INVENTION

Embodiments of the present invention are configured to permit detection of deceptive content. Certain embodiments are further configured to flag or eliminate deceptive content.

Figure 1A:
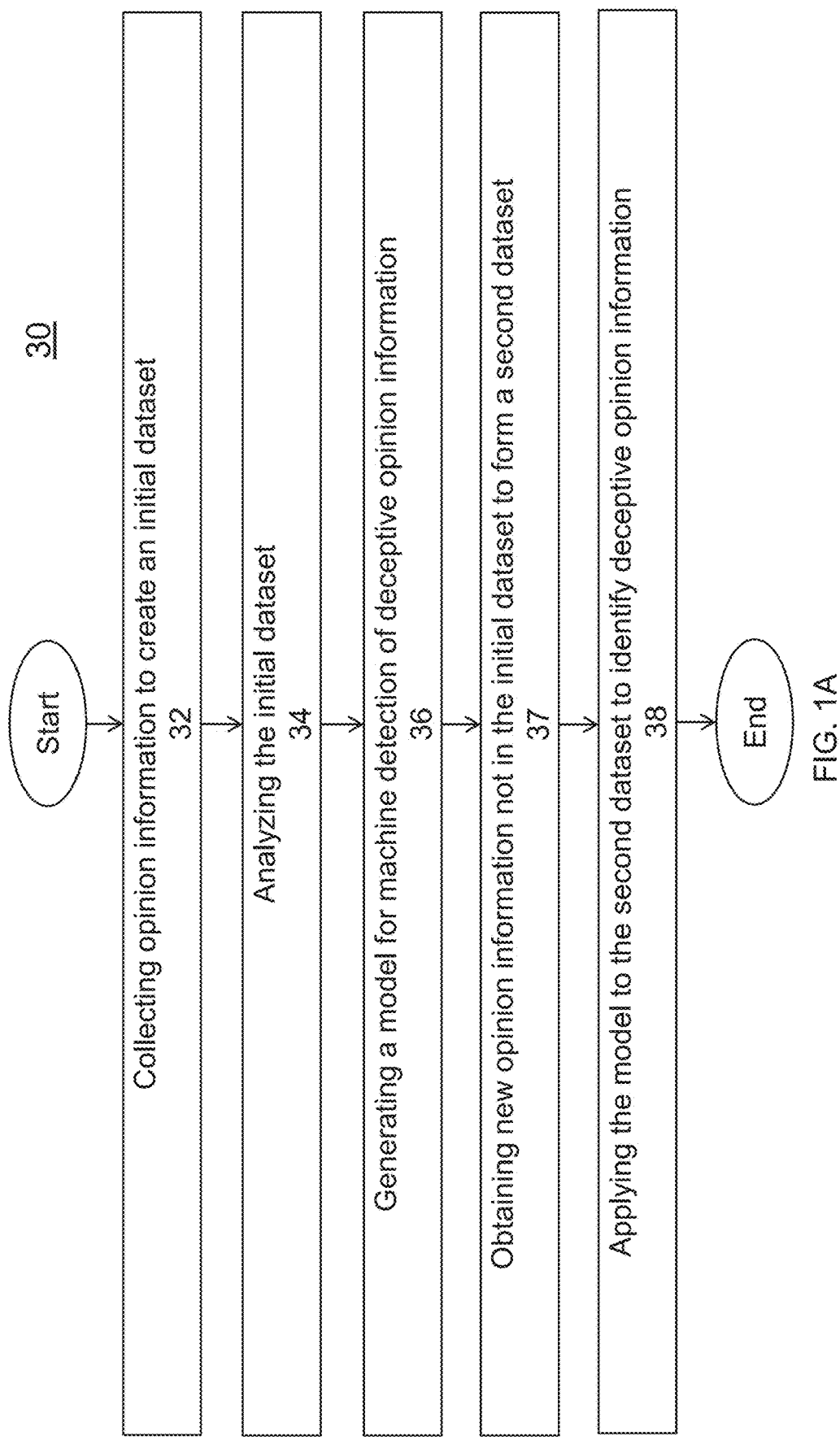
FIG. 1A illustrates a flowchart of a method according to an embodiment of the present invention.

As illustrated in FIG. 1A, certain method embodiments 30 of a present invention may include the steps of collecting opinion information to create an initial dataset 32, analyzing the collected opinion information 34, generating a model for machine detection of deceptive opinion information based on the analysis 36, obtaining new opinion information not in the initial dataset to form a second dataset 37, and applying the model to a second dataset to detect deceptive opinion information using a machine 38.

Figure 1B:
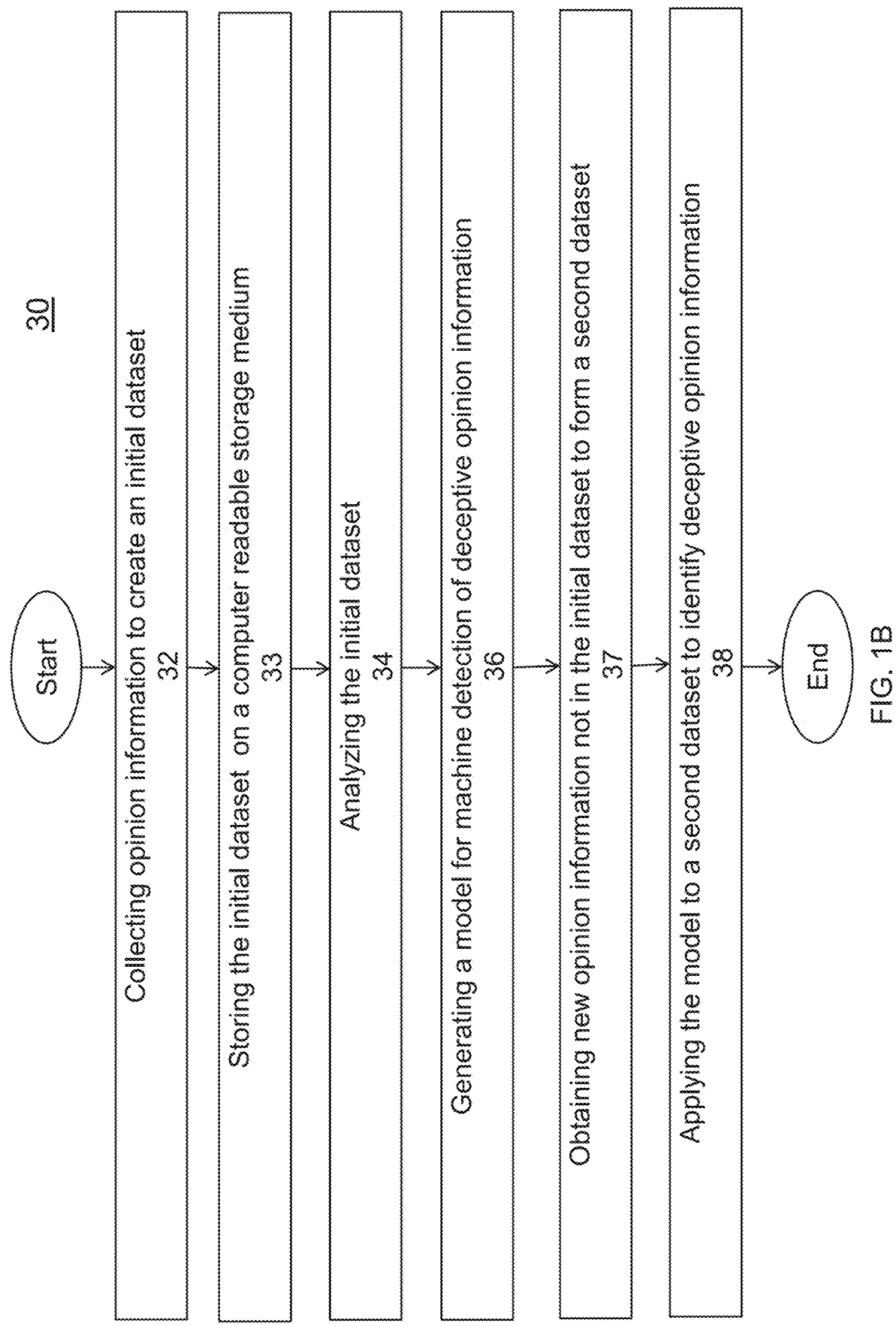
FIG. 1B illustrates a flowchart of a method according to an embodiment of the present invention.
Figure 1C:
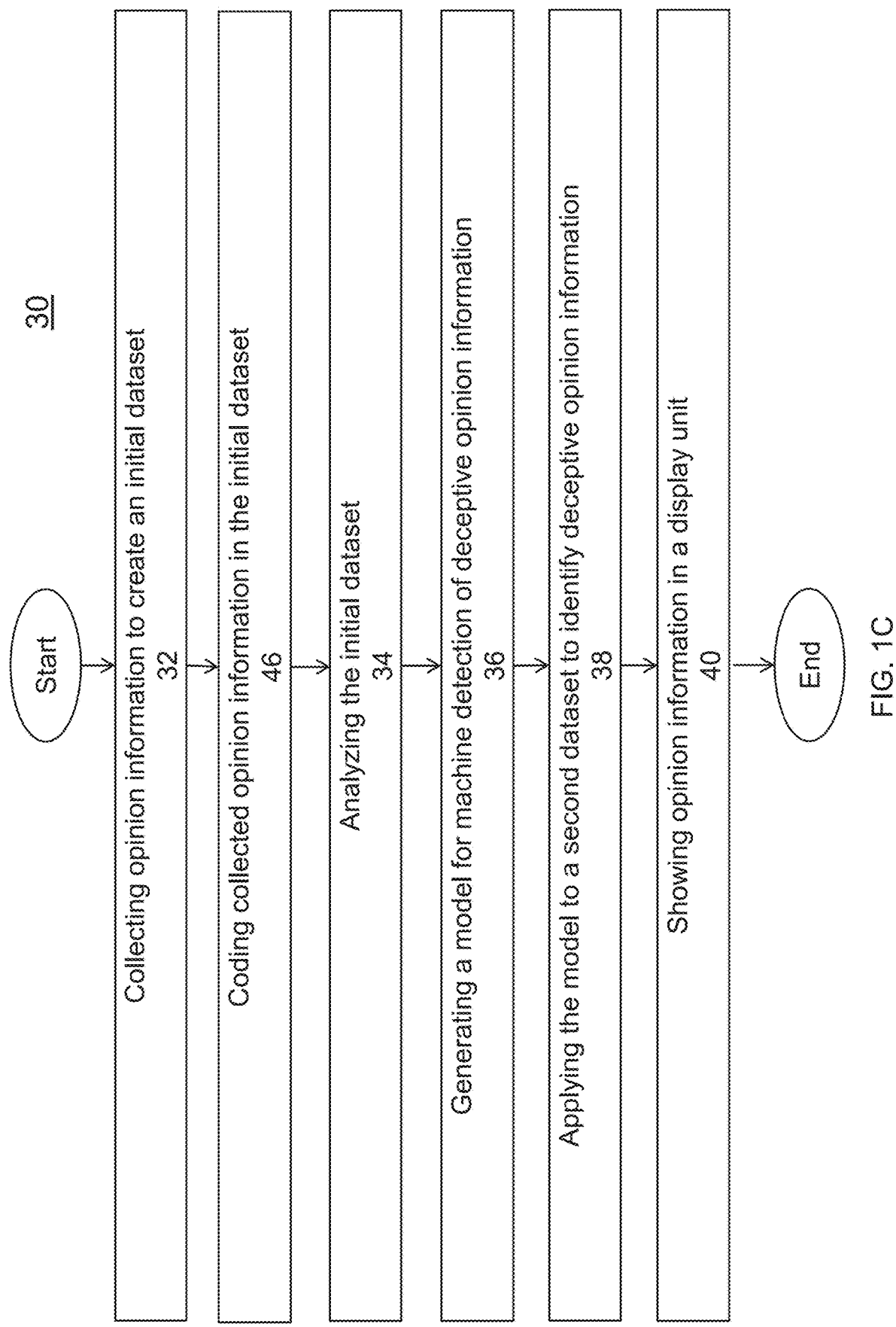
FIG. 1C illustrates a flowchart of a method according to an embodiment of the present invention.
Figure 1D:
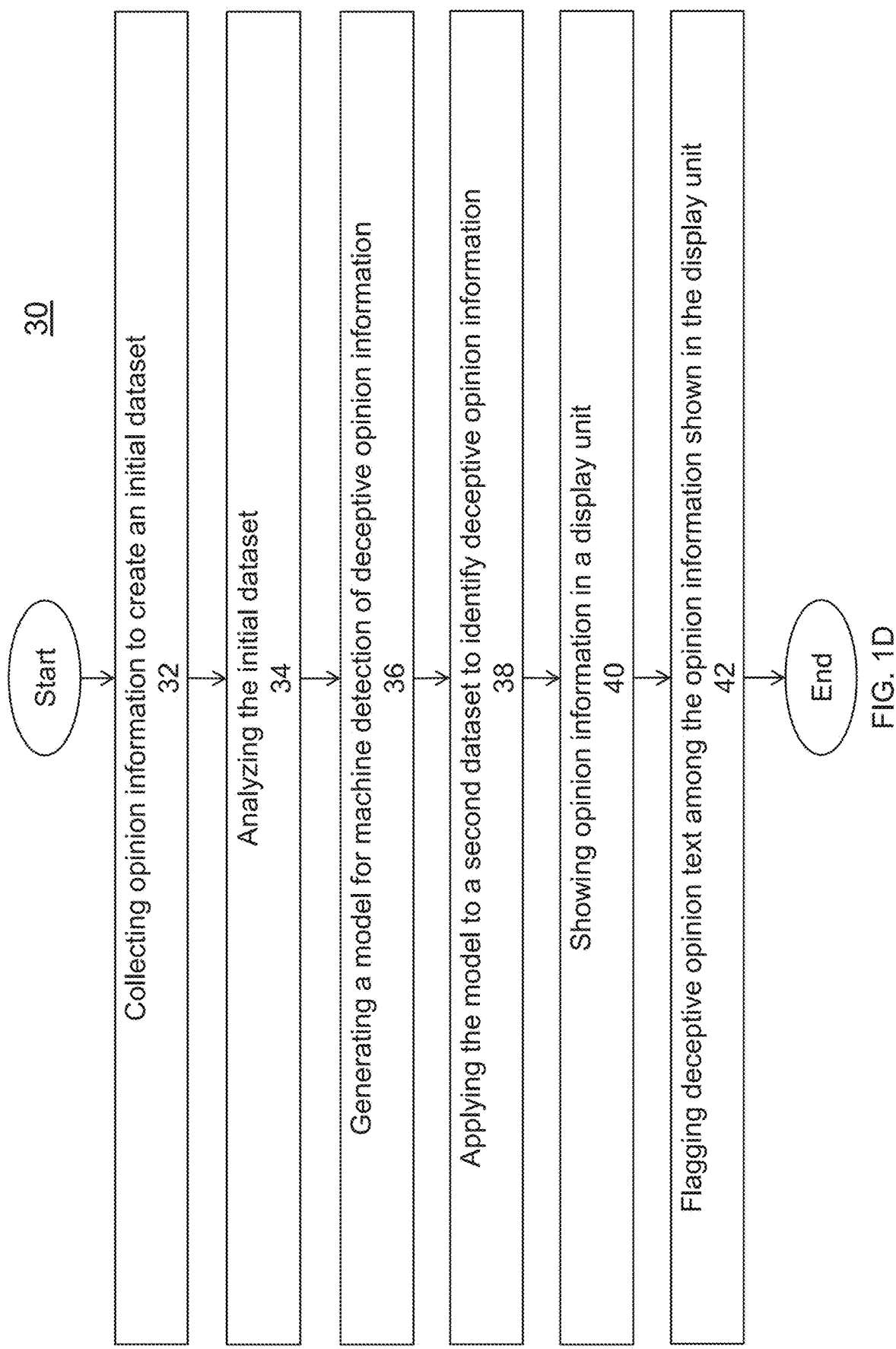
FIG. 1D illustrates a flowchart of a method according to an embodiment of the present invention.
Figure 1E:
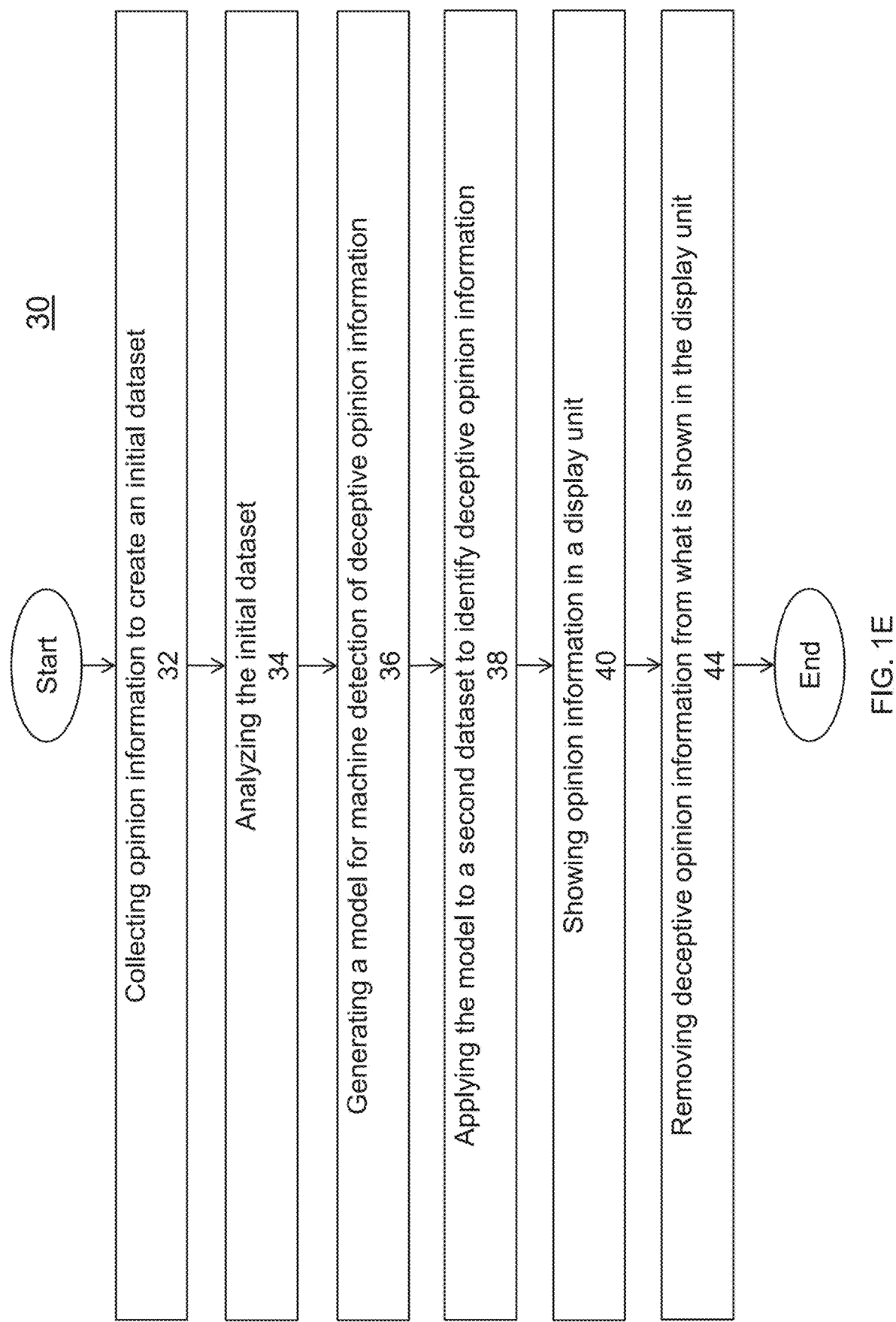
FIG. 1E illustrates a flowchart of a method according to an embodiment of the present invention.

As illustrated in FIG. 1B, certain method embodiments 30 also may include storing the initial dataset on a computer readable storage medium 33. Another step may include coding collected opinion information in the initial dataset 46 and showing opinion information on a display unit 40 as illustrated in FIG. 1C. Other embodiments may include flagging deceptive opinion information among the opinion information shown in the display unit 42 as illustrated in FIG. 1D. Also, deceptive opinion information may be removed from what is shown in the display unit 44 as illustrated in FIG. 1E. Each step is described in more detail below.

In certain embodiments of the present invention, opinion information is collected to form an initial dataset 32. Such information may be collected from reviews at a website, a book, a survey, email, transcribed video reviews, transcribed audio reviews, or other third party. Information may be publicly available or may be confidential. The gathering of opinion information may include mining public information, requesting confidential information, or preparation and distribution of survey questions to a group of people and receiving the survey answers from groups of people.

In one data collection example, 20 truthful and 20 deceptive opinions may be collected for each of 20 chosen businesses, which provides 800 total opinions. However, any number of opinions may be used for the initial dataset. In certain embodiments, reviews likely to be truthful are gathered from first source, e.g., obtained through a survey or mined from a website. Specifically, mined website reviews may be selected by certain criteria such as criteria that optimize the likelihood of getting "truthful" reviews. For example, choosing the "most popular hotels", based on either website standards or by greatest number of reviews, may permit the collector to obtain a higher percentage of "truthful" reviews. Subjects having many reviews are less likely to become targets of deceptive opinion spam, since the relative impact of one or two deceptive reviews is not likely to have an impact on the reputation of the subject in light of the many other "truthful" reviews.

Another data collection step may include gathering reviews known or thought to be deceptive. For purposes of comparison, deceptive opinions may be gathered from the first source or a second source for the same businesses identified in the "truthful" data collection step. A second source may include, for example, a second website, survey company, a crowdsourcing service provider such as Amazon Mechanical Turk (AMT), or many sources such as individuals who are filling out a survey.

For example, to obtain certain negative reviews, a random selection of "low quality" (e.g., 1 star or 2 star out of 5 stars) reviews may be obtained from a publicly available website.

In another example, to solicit high quality deceptive opinion spam, a pool of 400 requests, e.g., survey prompts or Human Intelligence Tasks (HITs) in AMT, may be created for a certain number of chosen hotels. To ensure that opinions are written by unique authors, only a single submission per person is allowed. The task also may be restricted to people who are located in the United States, speak English, and, for Turkers on AMT, people who maintain an approval rating of at least 90%. The deceptive review creators are allowed a maximum of 30 minutes to work on the task, and may be paid, for example, one US dollar for an accepted submission.

Each review request may include the name and website of a hotel. Certain requests may include a story. For example, the request may invite the reviewer to write a review from the perspective of a hotel marketing representative whose boss wants them to write a fake review from the perspective of a customer. The reviewer is informed that the fake review will be posted on a travel review website. Additionally, the request asks the reviewer to make the review sound realistic and portray the hotel in a positive light. A disclaimer indicates that any submission found to be of insufficient quality (e.g., written for the wrong hotel, unintelligible, unreasonably short such as if it contains fewer than 150 characters, plagiarized such as determined by http://plariarisma.net, etc.) will be rejected.

The reviews collected from the first source, the second source, and any additional sources then may be coded. The code labels may include "truthful", "deceptive", or other classifier. Such task may be done by, for example, adding a "truthful" label to each review thought to be truthful and adding a "deceptive" label to each review known to be deceptive. Each label may be an electronic symbol, a word, or other coding method. The coding may be done by a crowdsourcing service such as AMT. Such crowdsource service providers have made large-scale data annotation and collection efforts financially affordable by granting anyone with basic programming skills access to a marketplace of anonymous online workers (known as "Turkers") willing to complete small tasks.

FIG. 2 illustrates descriptive statistics for an example of an initial dataset of 400 deceptive opinion spam submissions gathered using AMT, wherein "s" corresponds to the sample standard deviation. Submissions in the example dataset vary quite dramatically both in length, and time spent on the task. Particularly, nearly 12% of the submissions were completed in less than one minute. Surprisingly, an independent two-tailed t-test between the mean length of these submissions $\bar{l}_{t<1}$ and the other submissions $\bar{l}_{t\geq1}$ reveals no significant difference (p=0.83). It is suspected that these "quick" users may have started working prior to having formally accepted the request, presumably to circumvent the imposed time limit. Indeed, the quickest submission took just 5 seconds and contained 114 words.

The truthful reviews and deceptive reviews may be organized. For truthful opinions in the example dataset, 6,977 reviews were mined from the 20 most popular Chicago hotels on a review website called TripAdvisor. A number of parameters are applied to the general dataset to remove lower quality opinion entries from the dataset. For example, non-5-star reviews (3,130 in this example); non-English reviews (41 in this example); reviews with fewer than 150 characters since, by definition, deceptive opinions are at least 150 characters long (75 in this example); and reviews written by first-time authors (1,607 in this example) may be eliminated from the dataset. First time authors are new users of a website who have not previously posted an opinion on that review website—in certain embodiments, TripAdvisor, Yelp, Hotels.com, Expedia, Orbitz, Priceline, Travelocity, or other review-based website.

Finally, the number of truthful and deceptive reviews may be balanced by selecting 400 of the remaining truthful reviews. In certain embodiments, the reviews may be selected randomly to achieve an equal number of truthful reviews and deceptive reviews. In other embodiments, the reviews are selected such that the document lengths of the selected truthful reviews are similarly distributed to those of the deceptive reviews. A log-normal distribution may be appropriate for modeling document lengths. Accordingly, in the example dataset, for each of the 20 chosen hotels, 20 truthful reviews are selected from a log-normal (left-truncated at 150 characters) distribution fit to the lengths of the deceptive reviews. Combined with the 400 deceptive reviews gathered previously, this yields the final initial dataset of 800 reviews.

In certain embodiments of the present invention, the initial dataset is analyzed. The analysis step may include classification of each review as "truthful" or "deceptive", or some other categorization system. The analysis step may be conducted by a human or a machine such as a computer system, and the results of each entity may be evaluated. To decrease the workload for the analysis, the dataset may be broken up into a number of subsets. Each subset contains an equal number of reviews relative to the other subsets. In certain embodiments, each subset contains all 40 reviews from each of four randomly chosen hotels corresponding to the first fold of the cross-validation experiments described below.

Additionally, to test the extent to which the individual human judges are biased, the performance of two virtual meta-judges may be evaluated. Specifically, the majority meta-judge may predict that a review is "deceptive" when at least two out of three human judges believe the review to be deceptive, and the "s" meta-judge predicts that a review is "deceptive" when any human judge believes the review to be deceptive. Human and meta-judge performance for the example dataset is shown in FIG. 3. Specifically, FIG. 3 illustrates the performance of three human judges and two meta-judges on a subset of 160 opinions with the boldface indicating the largest value for each column.

It is clear from the results that human judges are not particularly effective at the analysis step. Indeed, a two-tailed binomial test fails to reject the null hypothesis that Judge 2 and Judge 3 perform at-chance (p=0.003, 0.10, 0.48 for the three judges, respectively). Furthermore, human judges often suffer from truth-bias, a common finding in deception detection research in which human judges are more likely to classify an opinion as truthful than deceptive. In the example, Judge 2 classified fewer than 12% of the opinions as deceptive. This bias is effectively smoothed by the skeptic meta-judge, which produces nearly perfectly class-balanced predictions. A subsequent reevaluation of human performance on this task suggests that the truth-bias can be reduced if judges are given the class-proportions in advance, although such prior knowledge is unrealistic in many real world applications.

Inter-annotator agreement among the three judges in the example, computed using Fleiss' kappa, is 0.11. While there is no precise rule for interpreting kappa scores, scores in the range (0.00, 0.20] generally may correspond to "slight agreement" between annotators. The largest pairwise Cohen's kappa is 0.12, between Judge 2 and Judge 3—a value far below generally accepted pairwise agreement levels. The human judges rarely agree with one another possibly because humans are poor judges of deception, and therefore, humans perform nearly at-chance probabilities respective to one another.

In certain embodiments, the analysis step includes analyzing the initial dataset using one or more automated, or machine-implemented, approach. Three automated approaches are considered for detecting deceptive opinion spam, each of which utilizes classifiers trained on the initial dataset. The features employed by each strategy are outlined below.

One approach is termed the "genre identification approach". In such an approach, the opinion entry is reviewed for each part-of-speech (POS) and statistics about the position and frequency of each POS are acquired. The POS review includes recognition of words or phrases as nouns, pronouns, verbs, adjectives, adverb, article, preposition, participle, or conjunction. When the genre identification approach is applied to opinion spam detection, the POS statistics are cross-referenced with the genre/coding category—i.e., "truthful" or "deceptive"—to assess whether there is any relationship between POS statistics and the truthful/deception dichotomy. Certain POS statistics may be associated with each genre. For each review, features based on the frequencies of each POS tag are constructed. In certain embodiments, a parser such as the Stanford Parser, or another parser system may be used to obtain the relative POS frequencies.

Another approach that may be used to implement the analysis step may include what is termed the "Psycholinguistic deception detection". A text classifier may be used to classify text of the opinion entries into one of the following four psycholinguistic categories:
 1. Linguistic processes: Functional aspects of text (e.g., the average number of words per sentence, the rate of misspelling, swearing, etc.)
 2. Psychological processes: Includes all social, emotional, cognitive, perceptual and biological processes, as well as anything related to time or space.
 3. Personal concerns: Any references to work, leisure, money, religion, etc.
 4. Spoken categories: Primarily filler and agreement words.

One tool for classifying text into such categories is a Pennebaker Linguistic Inquiry and Word Count (LIWC). While a LIWC does not include a text classifier, one can be created with features derived from the LIWC output. In particular, LIWC counts and groups the number of instances of nearly 4,500 keywords into 80 psychologically meaningful dimensions. One feature for each of the 80 LIWC dimensions is constructed under the four psycholinguistic categories.

In contrast to genre identification approach and the psycholinguistic deception detection approach, a third approach—that which is termed a "text categorization approach" allows both content and context with n-gram features. An n-gram is a contiguous sequence of n items from a given sequence of text or speech. An n-gram could be any combination of phonemes, syllables, letters, or words. The n-grams typically are collected from a text. An n-gram of size 1 is referred to as a "unigram"; size 2 is a "bigram" (or, less commonly, a "digram"); size 3 is a "trigram". Larger sizes are sometimes referred to by the value of n, e.g., "four-gram", "five-gram", and so on. The variable "n" represents the number of items analyzed together. For example, the phrase "We loved this hotel" may be analyzed. In a unigram for letters, each character is analyzed separately, so the grouping is as follows: "W, e, _, l, o, v, e, d, _, t, h, i, s, _, h, o, t, e, l". In a bigram, every two characters are analyzed together, so the grouping is as follows: "We, _l, ov, ed, _t, hi, s_, ho, te, l_".

Specifically, the following n-gram feature sets may be considered in certain embodiments, with the corresponding features in lowercase and unstemmed: UNIGRAMS, BIGRAMS⁺, TRIGRAMS⁺, where the symbol "+" in superscript indicates that the feature set subsumes the preceding feature set. In one preferred embodiment of the present invention, word level unigrams and bigrams are assessed together.

Features from the genre identification approach, the psycholinguistic deception detection approach and the text categorization approach are used to train Naïve Bayes (NB) and Support Vector Machine classifiers. "Features" associated with "deceptive" content may include more nouns, adjectives, prepositions, determiners, and coordinating conjunctions, while the "truthful" content may consist of more verbs, adverbs, pronouns, and pre-determiners.

A Naïve Bayes classifier is a simple probabilistic classifier based on applying Bayes' theorem with strong independence assumptions. In other words, a Naïve Bayes classifier assumes that the presence or absence of a particular feature in a class is unrelated to the presence or absence of any other feature.

For a document $\vec{x}$, with label y, the NB classifier gives the following decision rule:

$$\hat{y} = \underset{c}{\operatorname{argmax}} \ Pr(y=c) \cdot Pr(\vec{x} \mid y=c) \qquad (1)$$

When the class prior is uniform, for example when the classes are balanced, Equation (1) can be simplified to the maximum likelihood classifier:

$$\hat{y} = \underset{c}{\operatorname{argmax}} \ Pr(\vec{x} \mid y=c) \qquad (2)$$

Under Equation (2), both the NB classifier and the language model classifier are equivalent. Accordingly, an SRI Language Modeling Toolkit may be used to estimate individual language models, $Pr(\vec{x} \mid y=c)$ for truthful and deceptive opinions. All three n-gram feature sets, namely UNIGRAMS, BIGRAMS⁺, and TRIGRAMS⁺, with corresponding language models smoothed using the interpolated Kneser-Ney method.

Support Vector Machine (SVM) reviews a set of input data and predicts, for each given input, which of two possible classes forms the output, a non-probabilistic binary linear classifier. Given a set of training examples, each marked as belonging to one of two categories, an SVM training algorithm builds a model that assigns new examples into one category or the other. An SVM model is a representation of the examples as points in space, mapped so that the examples of the separate categories are divided by a clear gap that is as wide as possible. New examples are then mapped into that same space and predicted to belong to a category based on which side of the gap they fall on. In other words, SVM classifiers are trained to find a high-dimensional separating hyperplane between two groups of data. To simplify feature analysis discussed below, the evaluation to linear SVMs is restricted, which learn a weight vector $\vec{w}$ and bias term b, such that a document $\vec{x}$ can be declassified by:

$$\hat{y} = \operatorname{sign}(\vec{w} \cdot \vec{x} + b) \qquad (3)$$

In certain embodiments, the linear SVM models are trained on all three approaches and feature sets described above, namely POS, LIWC, UNIGRAMS, BIGRAMS⁺, and TRIGRAMS⁺. Every combination of these features may be evaluated, but for brevity, in certain embodiments, may include a smaller combination such as only LIWC⁺BIG- RAMS+. Following standard practice, document vectors are normalized to unit-length. For LIWC+BIGRAMS+, LIWC and BIGRAMS+ features are unit-length normalized individually before combining them.

The results from the analysis steps are used to generate a model for detection of deceptive opinion information. Then, the models are applied to new untested information, such as information obtained in the collecting step or newly obtained opinion information. In certain embodiments, deception detection approaches—genre identification approach, the psycholinguistic deception detection approach, and the text categorization approach—may be evaluated using a 5-fold nested cross-validation (CV) procedure where model parameters are selected for each test fold based on standard CV experiments on the training folds. Folds are selected so that each contains all reviews from four hotels; and accordingly, learned models are always evaluated on reviews from unseen hotels.

The models for detection of deceptive opinion information may be evaluated, for example, for accuracy and the accuracy levels between approaches compared. FIG. 4 illustrates the automated classifier performance for three approaches based on nested 5-fold cross-validation experiments. Reported precision (P), recall (R), and F-score (F) are computed using a micro-average, i.e., from the aggregate true positive, false positive and false negative rates. Human performance is repeated here for Judge 1, Judge 2 and the Skeptic meta-judge, although they cannot be directly compared since the 160-opinion subset on which they are assessed only corresponds to the first cross-validation fold.

As illustrated by the information in FIG. 4, the automated classifiers outperform human judges for every metric, except truthful recall where Judge 2 performs best. Again, Judge 2 classified fewer than 12% of opinions as deceptive. While achieving 95% truthful recall, this judge's corresponding precision was not significantly better than chance (two-tailed binomial p=0.4).

However, this is expected given that untrained humans often focus on unreliable cues to deception. For example, one study examining deception in online dating found that humans perform at-chance detecting deceptive profiles because they rely on text-based cues that are unrelated to deception, such as second-person pronouns.

Among the automated classifiers, baseline performance is given by the simple genre identification approach ($POS_{SVM}$). Surprisingly, even this simple automated classifier outperforms most human judges (one-tailed sign test p=0.06, 0.01, 0.001 for the three judges, respectively, on the first fold). This result is best explained by theories of reality monitoring, which suggest that truthful and deceptive opinions might be classified into informative and imaginative genres, respectively. Strong distributional differences have been found between informative and imaginative writing, namely that the former typically consists of more nouns, adjectives, prepositions, determiners, and coordinating conjunctions, while the latter consists of more verbs (past participle verbs may be an exception), adverbs (superlative adverbs may be an exception), pronouns, and pre-determiners. Indeed, the weights learned by $POS_{SVM}$ as illustrated in FIG. 5 are largely in agreement with these findings, notably except for adjective and adverb superlatives, the latter of which may be an exception. However, that deceptive opinions contain more superlatives is not unexpected, since deceptive writing (but not necessarily imaginative writing in general) often contains exaggerated language.

Psycholinguistic and text categorization approaches to detecting deceptive opinion spam typically outperform the simple genre identification approach. Specifically, the psycholinguistic approach (LIWCSVM) proposed performs 3.8% more accurately (one-tailed sign test p=0.02), and the standard text categorization approach performs between 14.6% and 16.6% more accurately. However, high performance is achieved by combining features from these two approaches. Particularly, the combined model LIWC+BIGRAMS+$_{SVM}$ is 89.8% accurate at detecting deceptive opinion spam in certain embodiments.

Models trained only on UNIGRAMS—the simplest n-gram feature set—outperform many non-text-categorization approaches, and models trained on BIGRAMS+ perform even better (one-tailed sign test p=0.07). Although a universal set of keyword-based deception cues (e.g., LIWC) permits easier interpretation of the learned model, the deception detection is not as accurate. However, a context-sensitive approach (e.g., n-gram such as BIGRAMS+) permits improved deception detection performance.

Also, to evaluate the models, certain models are trained with "negative deceptive" reviews and certain models are trained with "positive deceptive" reviews. The results of the comparison for how each model worked is illustrated in FIG. 5. Reported precision (P), recall (R), and F-score (F) are computed. It appears that models trained in "positive deceptive" reviews may be better at detecting "positive deceptive" reviews than "negative deceptive" reviews and vice versa. Such models may be created using linear SVM trained with n-gram, e.g., unigram and bigram features. A nested-cross validation procedures may be employed, for example, a hold-one-hotel-out process in which each round of training one hotel's reviews are not included in the training set, but the held out hotel is then used for testing. The SVM cost parameter, C, may be tuned for each classifier using nested 5-fold cross validation on the training folds.

Further, in comparing false negative with false positive reviews, fake reviewers often overproduce negative emotion terms (e.g., angry, disappointed) relative to the truthful reviews in the same way that fake positive reviewers overproduced positive emotion terms (e.g., elegant, luxurious). Combined these data suggest that the more frequent negative emotion terms in the present dataset are not the result of "leakage cues" that reveal the emotional distress of lying. Instead, the differences suggest that fake hotel reviewers exaggerate the sentiment they are trying to convey relative to similarly-valenced truthful reviews.

Second, the effect of deception on the pattern of pronoun frequency may not be the same across positive and negative reviews. In particular, while first person singular pronouns may be produced more frequently in fake reviews than truthful, consistent with the case for positive reviews, the increase diminished in the negative reviews examined in one embodiment. In certain positive reviews, the rate of first person singular in fake reviews (M=4.36%, SD=2.98%) may be more than twice the rate observed in truthful reviews (M=1.95%, SD=2.16%). In contrast, the rate of first person singular in the deceptive negative reviews (M=4.46%, SD=2.82%) may be only one-half times greater than for truthful reviews (M=3.04%, SD=2.56%). These results suggest that the emphasis on the self, perhaps as a strategy of convincing the reader that the author had actually been at the hotel, is not as evident in the fake negative reviews, perhaps because the negative tone of the reviews caused the reviewers to psychologically distance themselves from their negative statements, a phenomenon observed in several other deception studies. Such observations may be incorporated into the models to permit improved detection of deceptive opinion entries, whether negative or positive.

To better understand the models learned by these automated approaches, the top 15 highest weighted features for each class (truthful and deceptive) as learned by LIWC$^+$ BIGRAMS$^+_{SVM}$ and LIWC$_{SVM}$ in the example dataset are illustrated in FIG. 6. Ambiguous features are subscripted to indicate the source of the feature. In certain embodiments, LIWC features correspond to groups of keywords. In line with certain theories of reality monitoring, it is observed that truthful opinions tend to include more sensorial and concrete language than deceptive opinions; in particular, truthful opinions are more specific about spatial configurations (e.g., small, bathroom, on, location). This finding is also supported by the suggestion that liars have considerable difficulty encoding spatial information into their lies. Accordingly, an increased focus in deceptive opinions has been observed on aspects external to the hotel being reviewed (e.g., husband, business, vacation).

Several findings are also acknowledged that, on the surface, are in contrast to previous psycholinguistic studies of deception. For instance, while deception is often associated with negative emotion terms, deceptive reviews have more positive and fewer negative emotion terms. This pattern makes sense when one considers the goal of deceivers, namely to create a positive review.

Deception has also previously been associated with decreased usage of first person singular, an effect attributed to psychological distancing. In contrast, increased first person singular is found to be among the largest indicators of deception, which may be due to deceivers attempting to enhance the credibility of their reviews by emphasizing their own presence in the review. These findings suggest the importance of moving beyond a universal set of deceptive language features (e.g., LIWC) by considering both the contextual (e.g., BIGRAMS$^+$) and motivational parameters underlying a deception as well.

According to the present invention, the first large-scale dataset containing high quality deceptive opinion spam has been developed. Three automated approaches to deceptive opinion spam detection have been introduced, based on insights coming from research in computational linguistics and psychology. While an n-gram-based text categorization is the best individual detection approach, a combination approach using psycholinguistically-motivated features and n-gram features can perform slightly better.

The present invention suggests the importance of considering both the context (e.g., BIGRAMS$^+$) and motivations underlying a deception, rather than strictly adhering to a universal set of deception cues (e.g., LIWC). The present invention also presents results based on the feature weights learned by classifiers that illustrate the difficulties faced by liars in encoding spatial information. Lastly, a plausible relationship between deceptive opinion spam and imaginative writing, based on POS distributional similarities, has been reviewed.

It is contemplated the present invention is applicable to both negative opinions, as well as opinions coming from other domains. Many additional approaches to detecting deceptive opinion spam are also possible, and a focus on approaches with high deceptive precision might be useful for production environments. Other approaches that may be implemented in certain embodiments of the present invention include such as Decision Trees, Random Forests, Neural Networks, Logistic Regression, or other binary classifiers known in the art. In certain embodiments, competing classifiers could also be combined into a single "ensemble" classifier by averaging the respective outputs. Some of these classifiers can also predict probabilities of deceptiveness or truthfulness, e.g., 75% "deceptive," rather than just binary "truthful" vs. "deceptive" classification.

Figure 7:
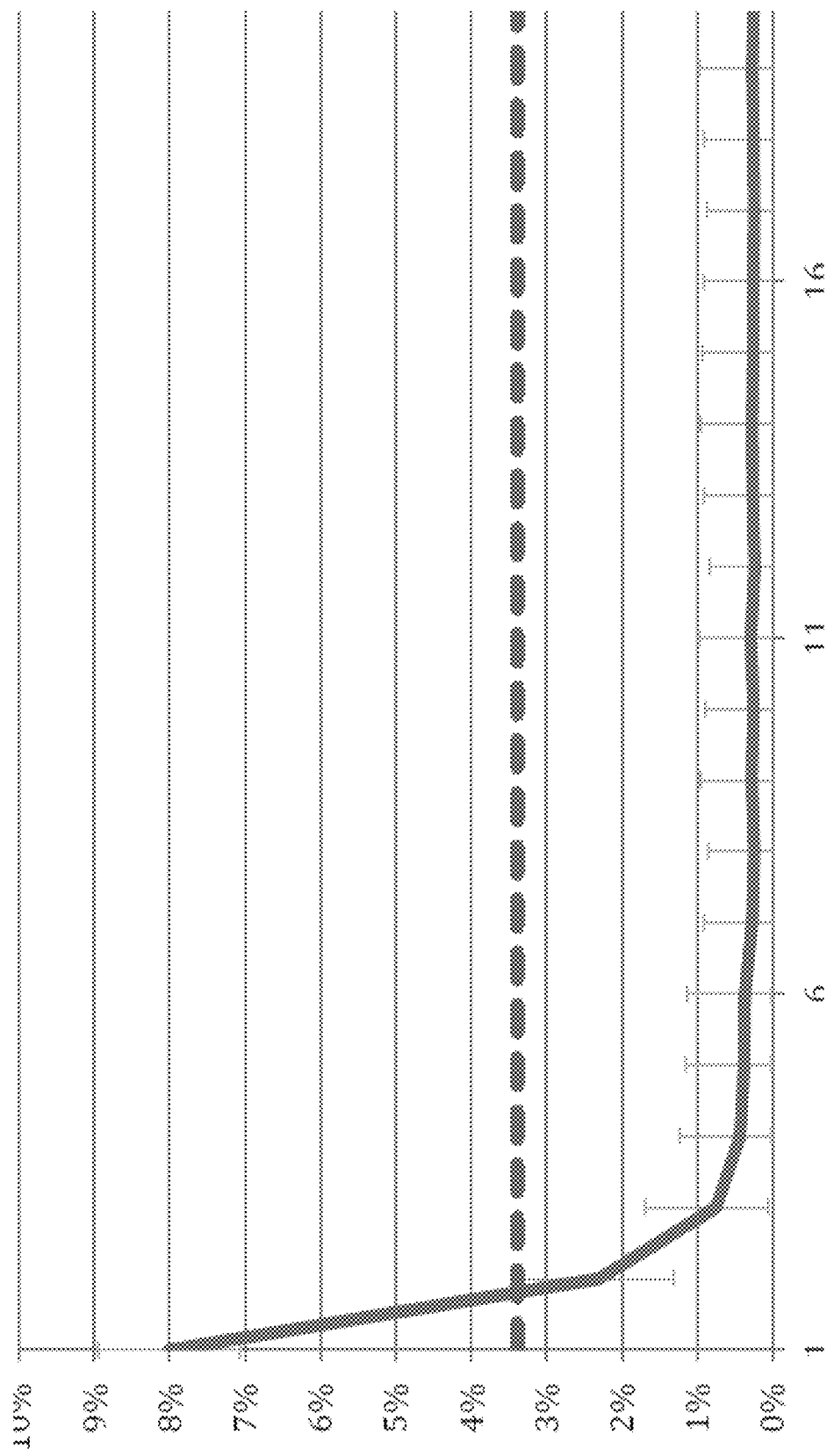
FIG. 7 illustrates a chart of prevalence of deception among users according to an embodiment of the present invention.

It is also contemplated that in addition to the assessment of the deceptiveness of individual documents, the present invention may also assess the prevalence of deception in a group of documents. For example, in the context of user-generated reviews, the present invention can assess the prevalence of deception in groups, for example, reviews written by a specific user or reviews written by a group of users, e.g., users who have written only a single review. FIG. 7 illustrates the prevalence of deception among users who have written x or more reviews. The solid line denotes reviews of Chicago hotels on TripAdvisor and the broken line denotes deception prevalence across all Chicago hotel reviews on Hotels.com.

Figure 8:
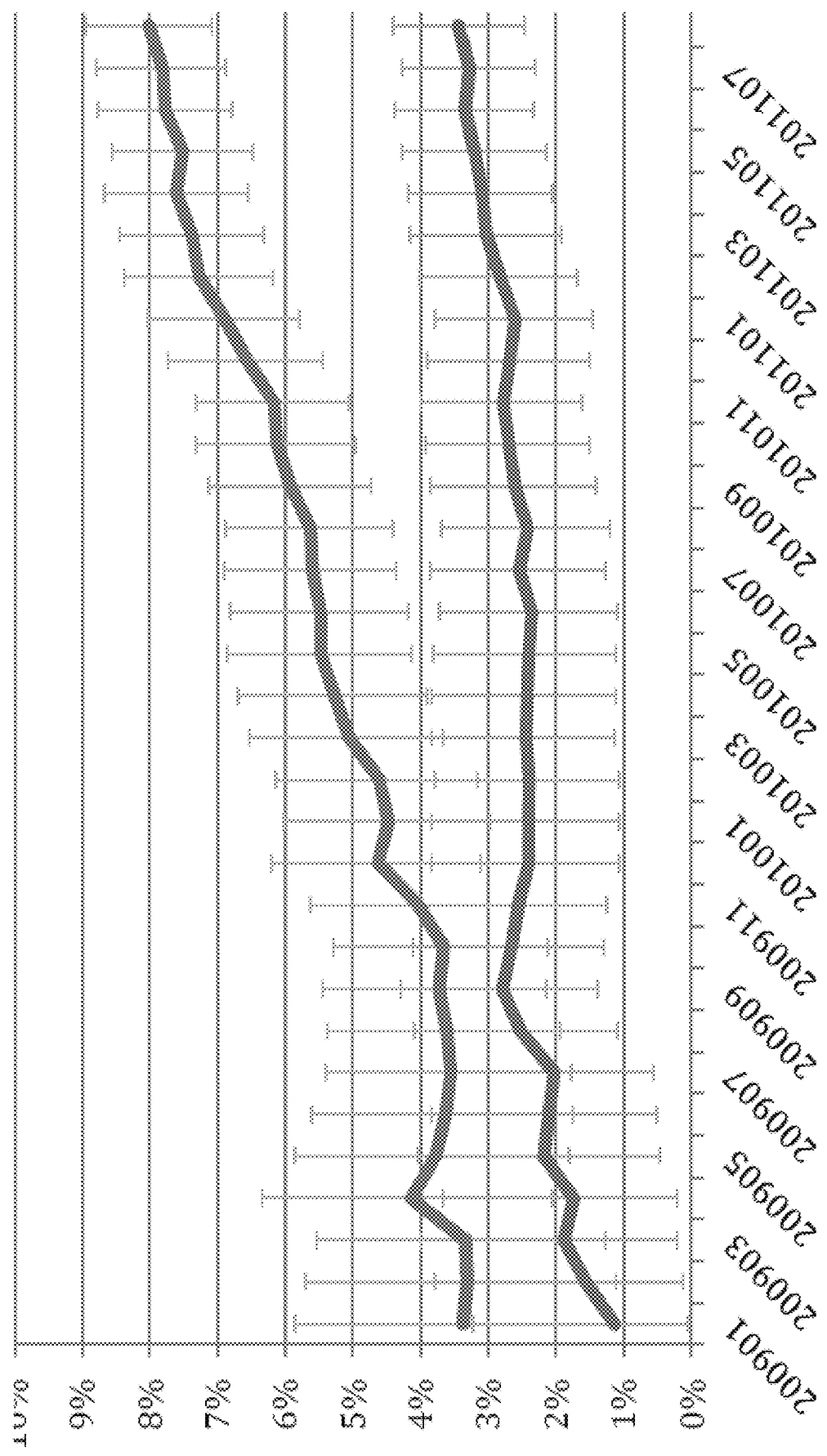
FIG. 8 illustrates a chart of prevalence of deception versus time according to an embodiment of the present invention.

The invention may also assess reviews written for a specific product or business; or reviews written for a group of products or businesses, e.g., products sold by a specific merchant, products of a specific brand, businesses in a specific region; or reviews in an entire review community, e.g., TripAdvisor.com or Hotels.com. In addition, it is contemplated that the present invention may assess reviews written in a specific time interval, e.g., reviews prior to Jan. 31, 2009. FIG. 8 illustrates the prevalence of deception versus time (in a time period), the top line denoting reviews of Chicago hotels on TripAdvisor.com and the bottom line denoting reviews of Chicago hotels on Hotels.com.

Certain embodiments of the present invention makes binary assessments of deception, i.e., a document is assessed to be either truthful or deceptive. However, the present invention is also contemplated to produce both a point estimate of the prevalence of deception in a group of documents (as a percentage), as well as a confidence interval that contains lower and upper bounds of the prevalence estimate. For example, in the context of sorting a list of products or businesses, the present invention enables sorting products or businesses in at least the following ways: point estimate of prevalence of deception, lower bound of estimate of prevalence of deception, and upper bound of estimate of prevalence of deception.

The present invention identifies users in an online review community who have likely posted deceptive reviews. In addition, the present invention identifies products or businesses in an online review community that have either been victims of, or solicited deceptive reviews. Furthermore, the present invention analytically finds ways to minimize or combat deception in an online review community (see FIG. 7 and FIG. 8).

Figure 9A:
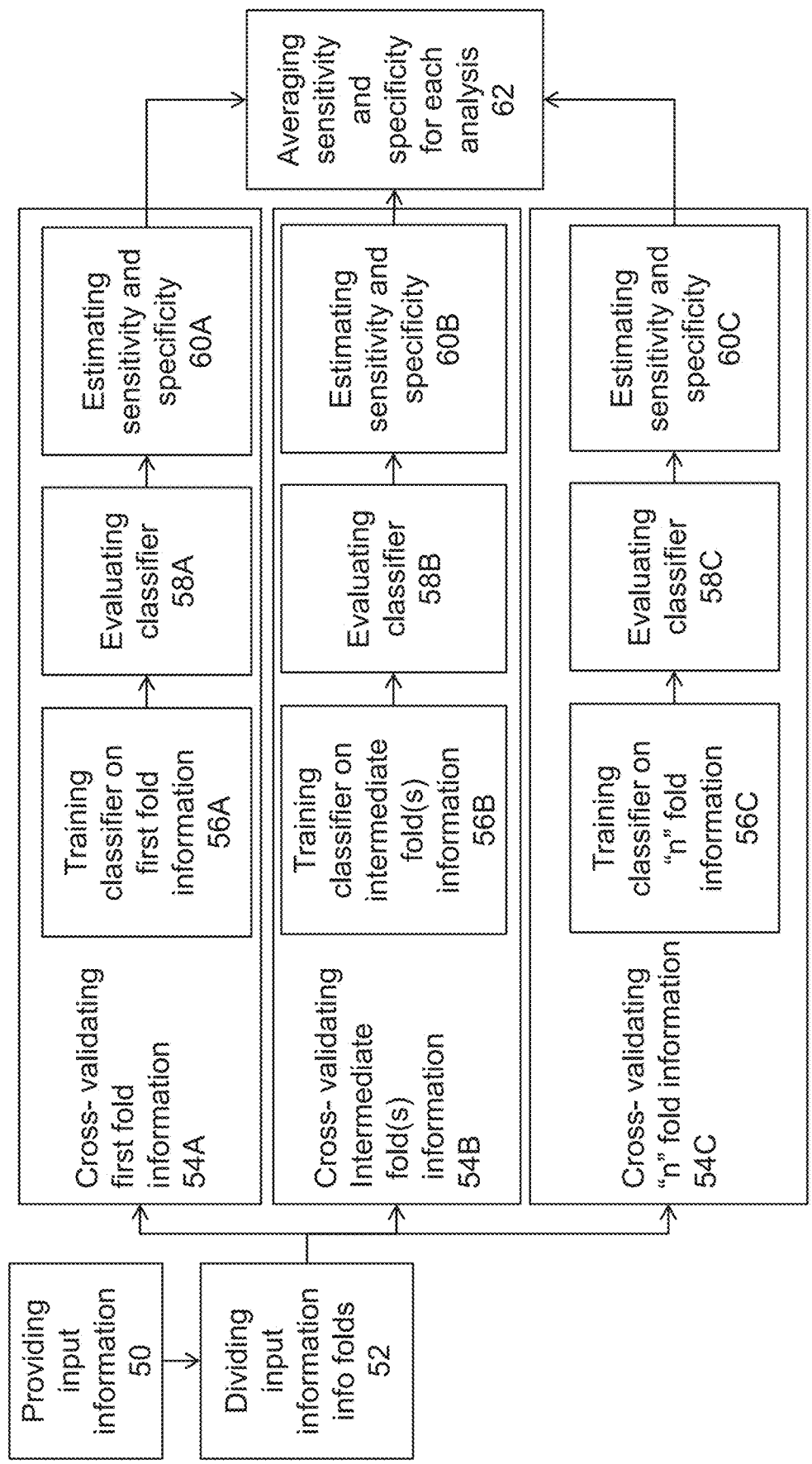
FIG. 9A illustrates a flow chart of one embodiment according to an embodiment of the present invention.

As shown in FIG. 9A, information is divided into folds for each cross validation. Prevalence of a group of documents is implemented by first providing an input 50, for example, a group of training documents and their corresponding deceptiveness labels, D$_{train}$; a group of test documents with or without deceptiveness labels, D$_{test}$; or the number of cross-validation folds to use, n.

Figure 9B:
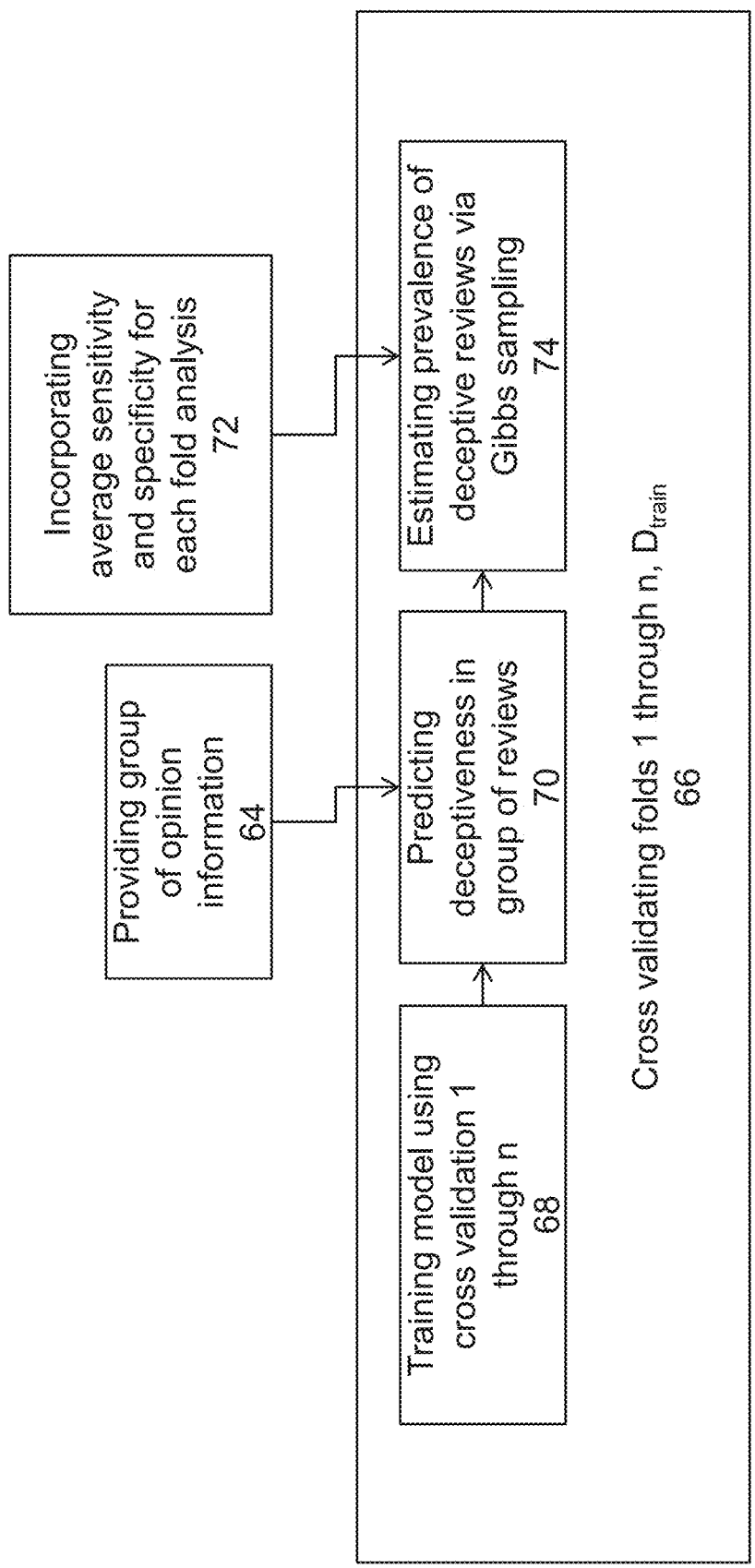
FIG. 9B illustrates a flow chart of one embodiment according to an embodiment of the present invention.
Figure 10:
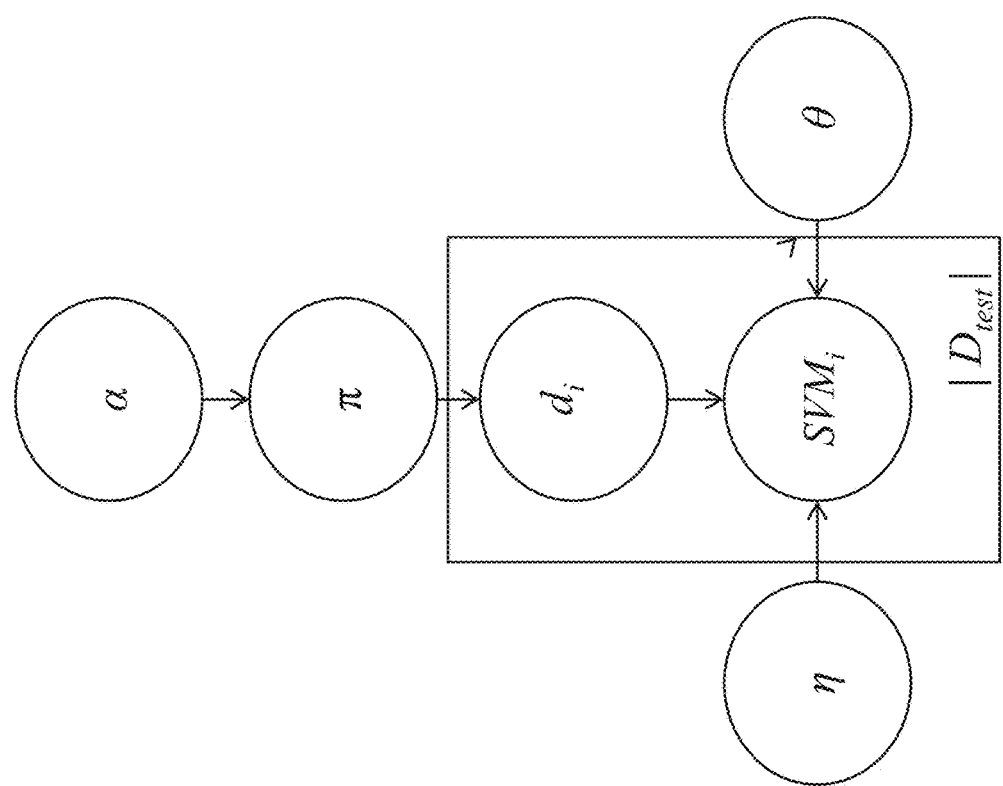
FIG. 10 illustrates a graphical model of deception prevalence according to an embodiment of the present invention.

Prevalence of deception in D$_{test}$, along with corresponding confidence interval is output. As illustrated in FIG. 9A, certain embodiments include calculating the estimated average classifier sensitivity and specificity by first obtaining D$_{train}$ information 50, then splitting D$_{train}$ into n stratified cross-validation train and test sets or "folds" 52, CV$_{train}$={CV$_{train1}$, . . . , CV$_{train,n}$} and CV$_{test}$={CV$_{test,1}$, . . . , CV$_{test,n}$}, stratified according to the given deceptiveness labels. For i∈[1,n], to cross validate each fold 54, a classifier may be trained using CV$_{train,i}$ 56 and the resulting classifier on CV$_{test,i}$ is evaluated 58 for each fold. The resulting sensitivity, η$_i$ (deceptive recall) and specificity, θ$_i$ (truthful recall) is recorded 60. The cross-validating 54, e.g., training 56 and evaluating the classifiers and then estimating sensitivity and specificity 60 is done for each fold. The average sensitivity and specificity is computed based on the cross-validation results, $$\eta = \frac{1}{n}\sum_{i=1}^{n} \eta_i \text{ and } \theta = \frac{1}{n}\sum_{i=1}^{n} \theta_i$$

for each fold, respectively 62. As illustrated in FIG. 9B, given a group of opinion information 64, a classifier may also be cross validated using folds 1 through n 66. Specifically, a classifier may be trained using all input training data 68, $D_{train}$. Predictions are made with the resulting classifier on input test data, $D_{test}$, 70 and the number of predicted deceptive and truthful documents, A and B, respectively, such that A+B=|$D_{test}$| are recorded. Prevalence of deception in $D_{test}$ is estimated via Gibbs sampling 74 of the graphical model given in FIG. 10 using blocked updates. The Gibbs sampling may incorporate average sensitivity for each fold analysis 74 illustrated in FIG. 9A. Specifically, FIG. 10 illustrates a graphical model (in plate notation) of deception prevalence with certain nodes corresponding to observed variables (e.g., η, $SVM_i$, and θ). Another graphical model of deception prevalence is illustrated in FIG. 10B.

The generative storyline is as follows: (a) sample prevalence of deception in $D_{test}$: π~Beta(α) and (b) for each document $D_{test,i} \in D_{test}$: (i) sample deceptiveness for $D_{test,i}$: $d_i$~Bernoulli(π) and (ii) sample SVM classifier output:

$$SVM_i \sim \begin{cases} \text{Bernoulli}(\eta), & \text{if } d = 1 \\ \text{Bernoulli}(\theta), & \text{if } d = 0 \end{cases}.$$

The point estimate of π as given by the Gibbs sampler is determined and returned, along with the desired confidence interval.

Figure 11B:
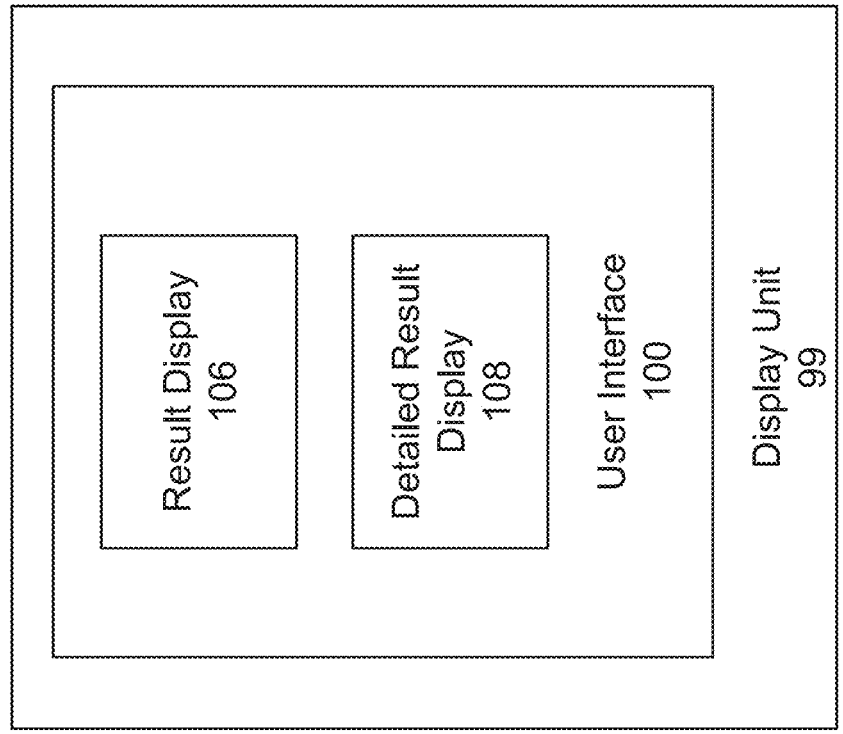
FIG. 11B illustrates an embodiment of a screen in a interface according to an embodiment of the present invention.
Figure 11A:
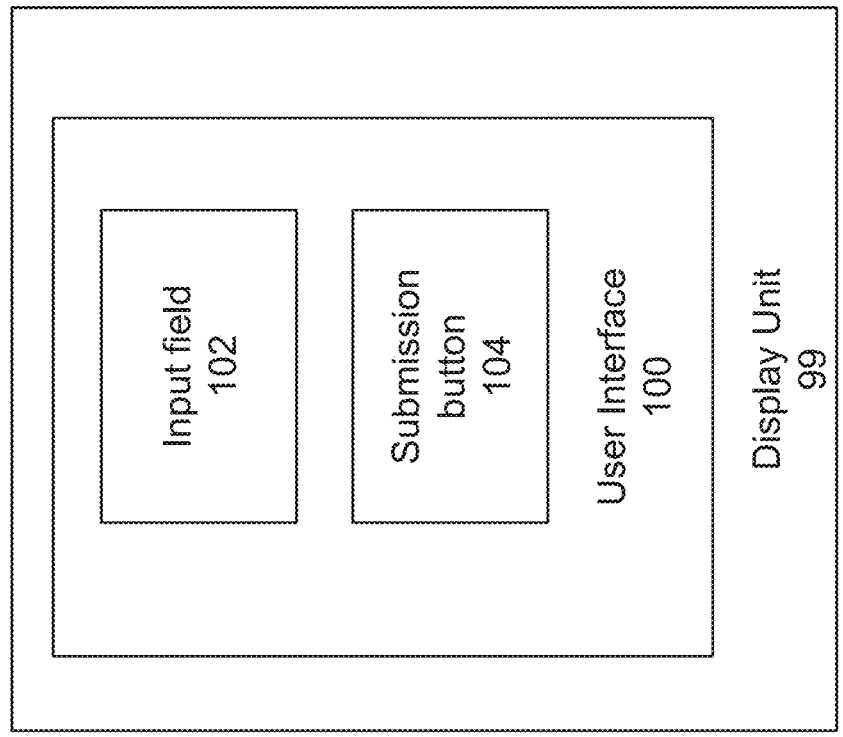
FIG. 11A illustrates an embodiment of a screen in a user interface according to an embodiment of the present invention.

FIG. 11A and FIG. 11B illustrate an embodiment of a user interface 100 for the present invention. A user interface 100 may be configured to be viewable via a display unit 99. Embodiments of the user interface 100 include an input field 102, configured to permit a user to input generally one or more reviews, and a submission button 104, generally configured to permit the user to submit the input for evaluation based on a model. Embodiments of the user interface 100 also may include a field that permits the user to label the input as known to be "deceptive" or known to be "truthful".

A second screen of the user interface 100 may include a results display 106 as illustrated in FIG. 11B. A results display 106 includes the classification—that is, deceptive or truthful—for the inputted review. A detailed results display 108, may include more information about how the result was determined. For example, in certain embodiments, the text of the inputted review is shown having "deceptive"-type words in one color or font or other distinguishing expression and "truthful"-type words in a second color or font or other distinguishing expression. The detailed results display 108 also may supply mathematical calculations done on the inputted review.

Figure 12A:
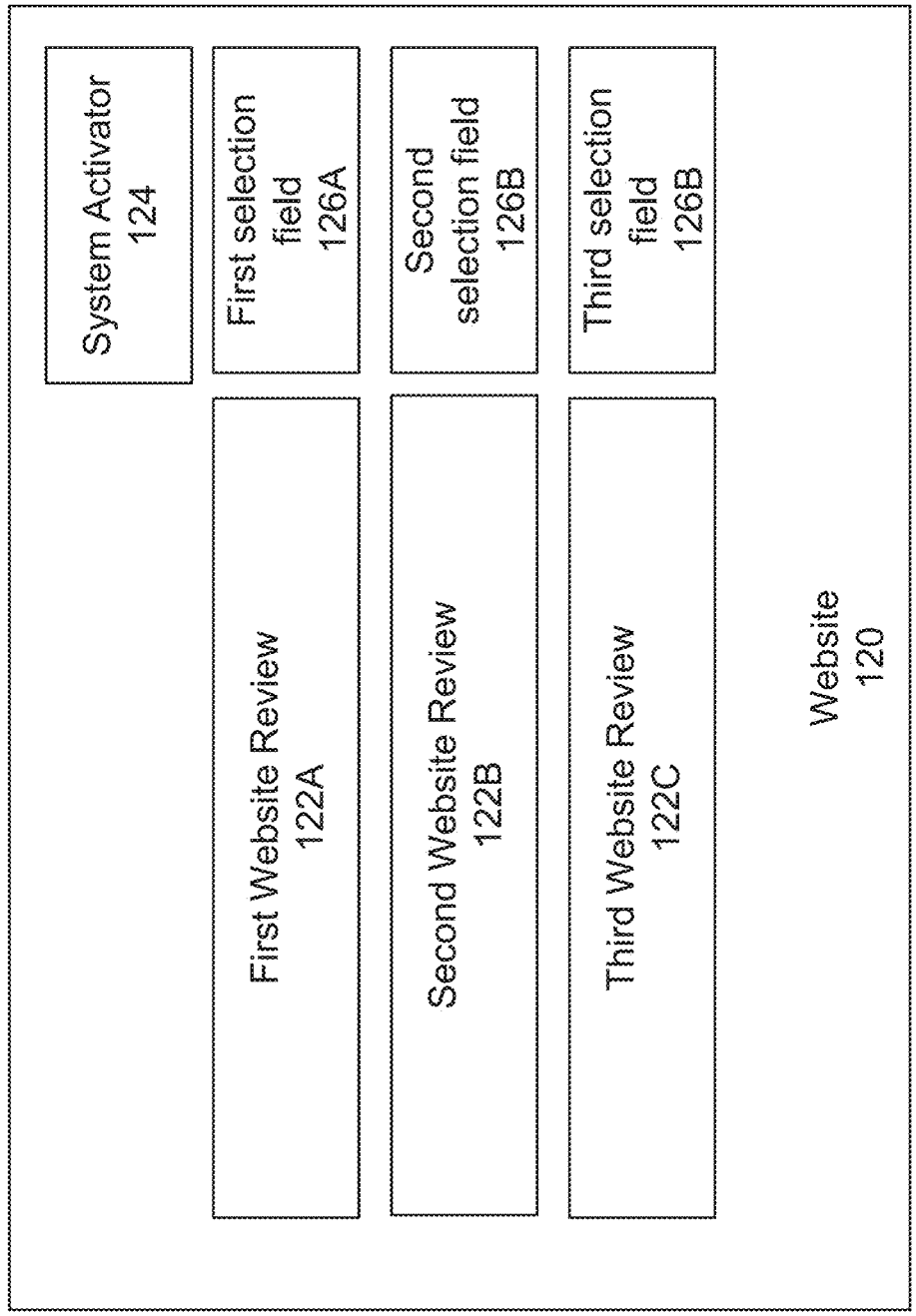
FIG. 12A illustrates a system incorporated into a review-based website according to an embodiment of the present invention.
Figure 12B:
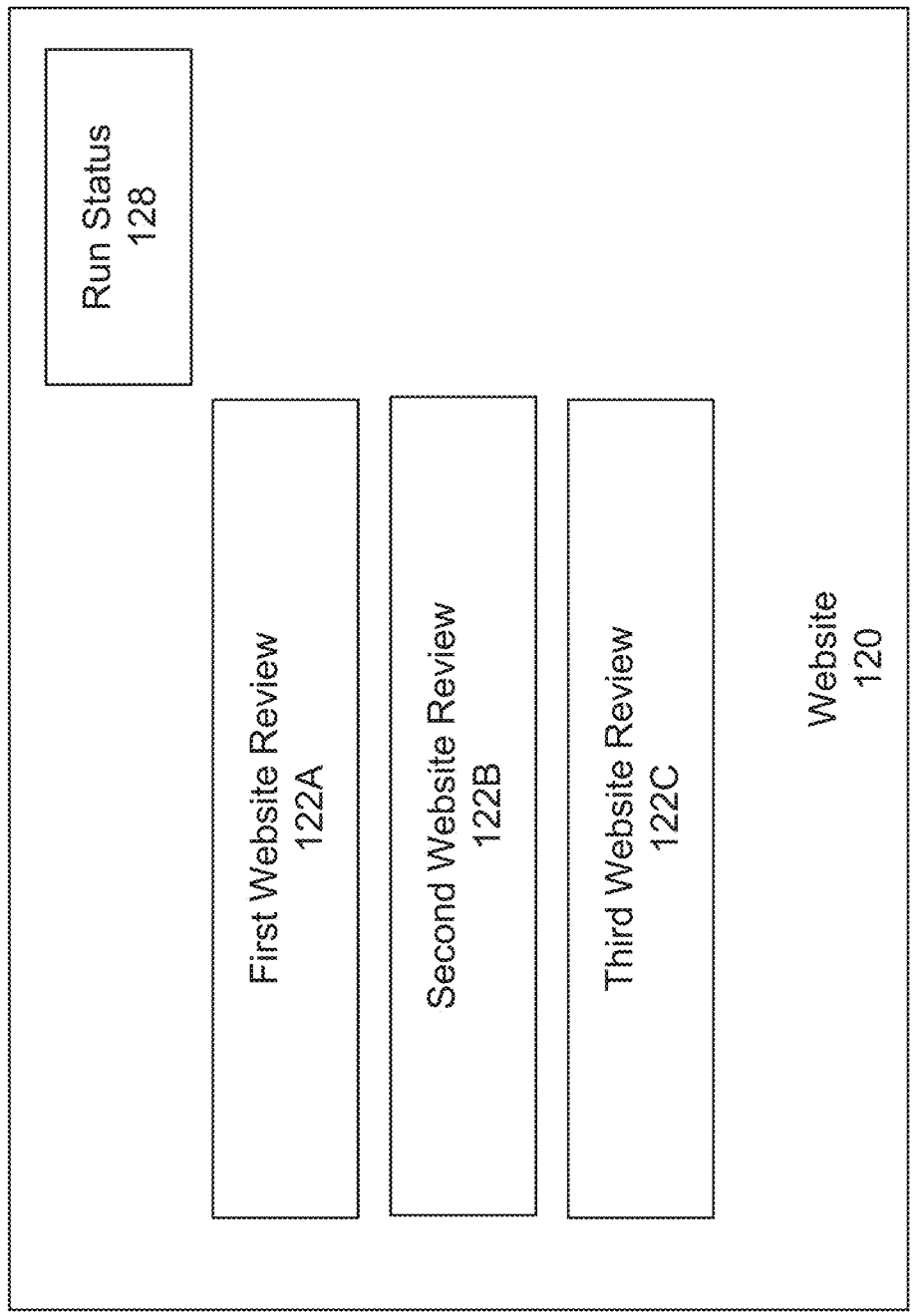
FIG. 12B illustrates a system incorporated into a review-based website according to an embodiment of the present invention.

An embodiment of the system of the present invention is configured to be integrated into a website 120 as illustrated in FIG. 12A-12D, a database, or another information source. A system activator 124 may include a button, field, or other activator configured to permit a website administrator to activate an embodiment of the present invention. Upon activation, a deception detection model may be applied to any number of entries or reviews 122A, 122B, 122C on the website 120 to assess which reviews are likely to be deceptive. Certain embodiments include a selection field 126A, 126B, 126C, e.g., a check box, for each review, which permits a website administrator to select which reviews should be assessed in a particular run of the deception detection model. The system may be configured to run automatically upon receipt of a review, or may periodically assess all reviews or all new reviews in the website. While the model is running, a run status 128 may alert the system administrator that a run is in progress and may update in real-time to display the percentage of run completion as illustrated in FIG. 12B.

Figure 12C:
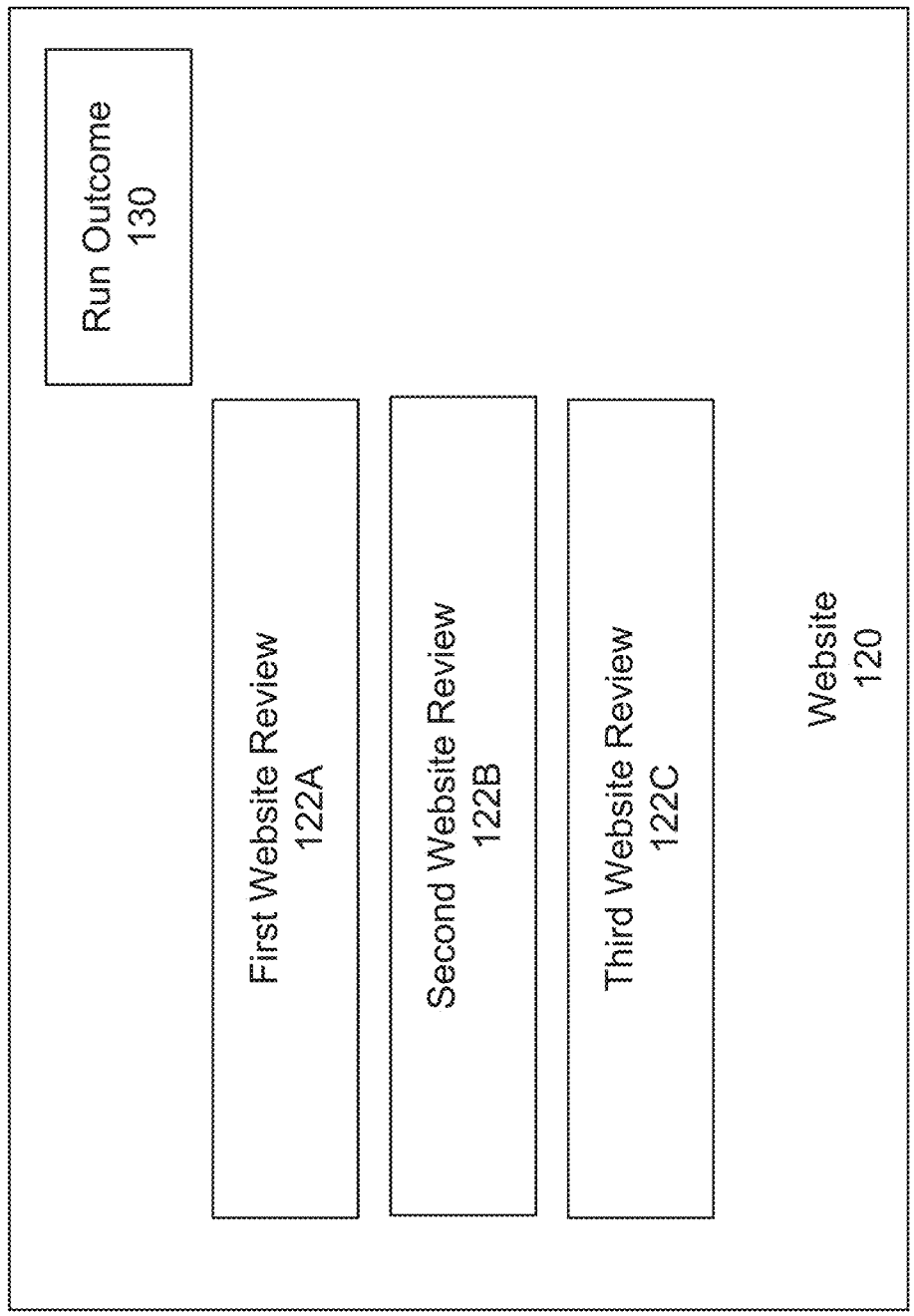
FIG. 12C illustrates a system incorporated into a review-based website according to an embodiment of the present invention.
Figure 12D:
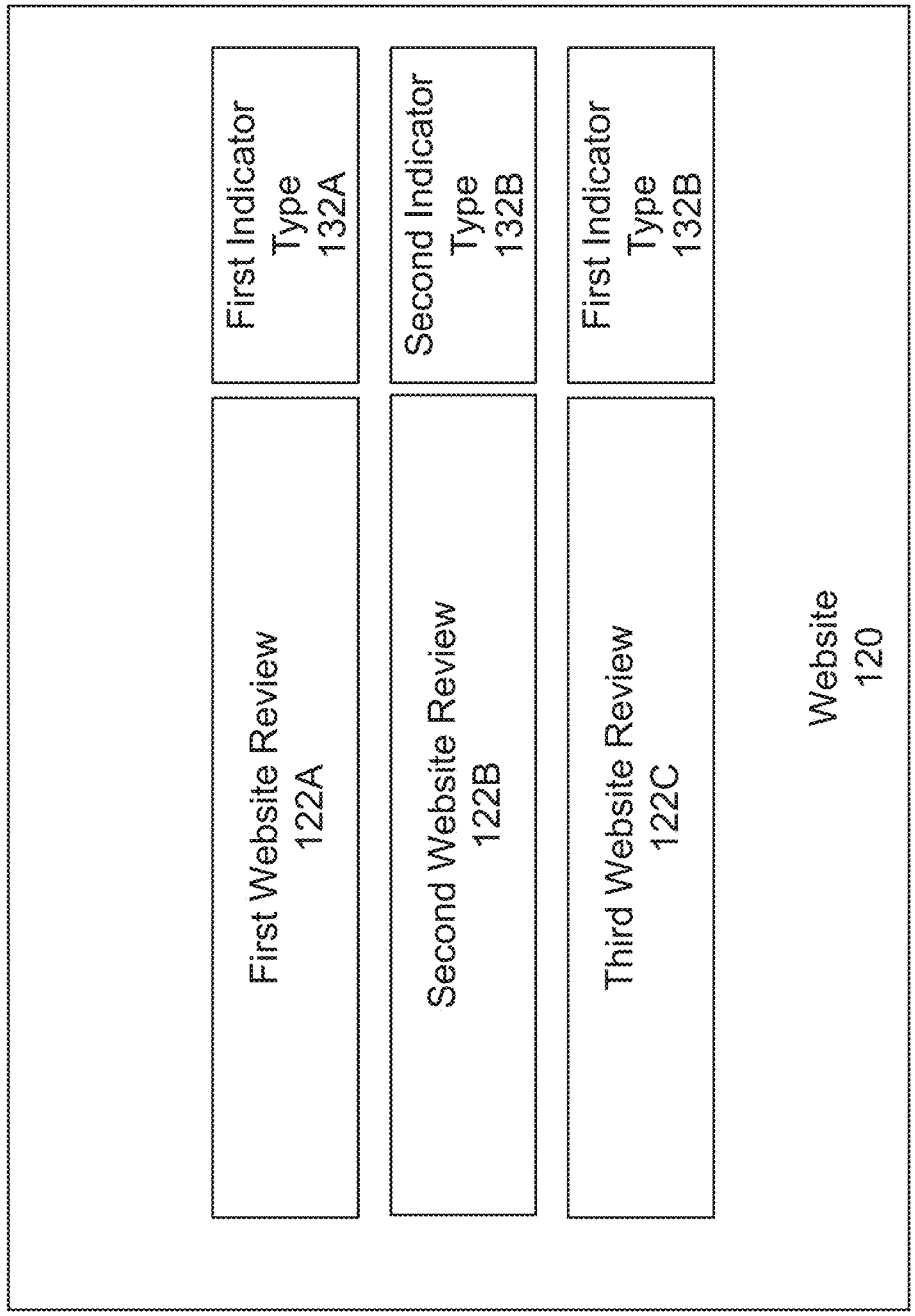
FIG. 12D illustrates a system incorporated into a review-based website according to an embodiment of the present invention.

Upon completion of the run, a run outcome 130 may be produced automatically, as illustrated in FIG. 12C. A run outcome 130 may include a report identifying the reviews, opinion entries, websites, or datasets categorized as "deceptive" or "truthful" or statistics about the same. A run outcome 130 also may include indicators that are designated to signify either "deceptive" classification, "truthful" classification, or other similar classification scheme assigned to and displayed with each review, as illustrated in FIG. 12D. In certain embodiments, only the reviews classified as "deceptive" receive an indicator, or only the reviews classified as "truthful" receive an indicator. Accordingly, in such embodiments, the absence of an indicator also may provide the user with information about the review. In other embodiments, both "deceptive" and "truthful" reviews are assigned an indicator that is unique relative to the other. An indicator may include a symbol, character, letter, design, color, representation, or other expression configured to convey the relative classification. Another set of indicators may be designated to identify whether a "deceptive" review is a "false positive" or a "false negative".

In certain embodiments, an indicator may be designated to signify that a specific review, opinion entry, website, or dataset has been or regularly is reviewed by a deception detection model. Such indicator may be configured to convey to users that the information provided has passed the deception detection model or, if not, is identified as "deceptive" indicator or another appropriate classification. Advantageously, users will then have more information with which to evaluate the value of the reviews, opinion entries, website, or other.

In certain embodiments, a specific reviewer or reviewer account may be identified as a source of deceptive or truthful reviews. Moreover, if the deception detection model reveals one or more reviews or entries associated with a specific business, an indicator may be associated with that business. In certain circumstances, the business may have solicited the illegitimate reviews. Again, the appropriate indicators permit a system user to have more information with which to evaluate the value of the reviews, opinion entries, website, or business.

Certain embodiments integrated with a website or other external dataset automatically generate the indicators in the website or other external dataset. For example, the indicators may be posted and viewable by a website user immediately after a run of the deception detection model. In other embodiments, certain indicators automatically populate in a website or dataset, but must be approved by, for example, a website administrator before they are viewable to the public.

While certain embodiments are discussed in reference to integration with a website, this discussion is merely exemplary. Embodiments of the present invention may be integrated in any system for disseminating opinion information known in the art.

Figure 13:
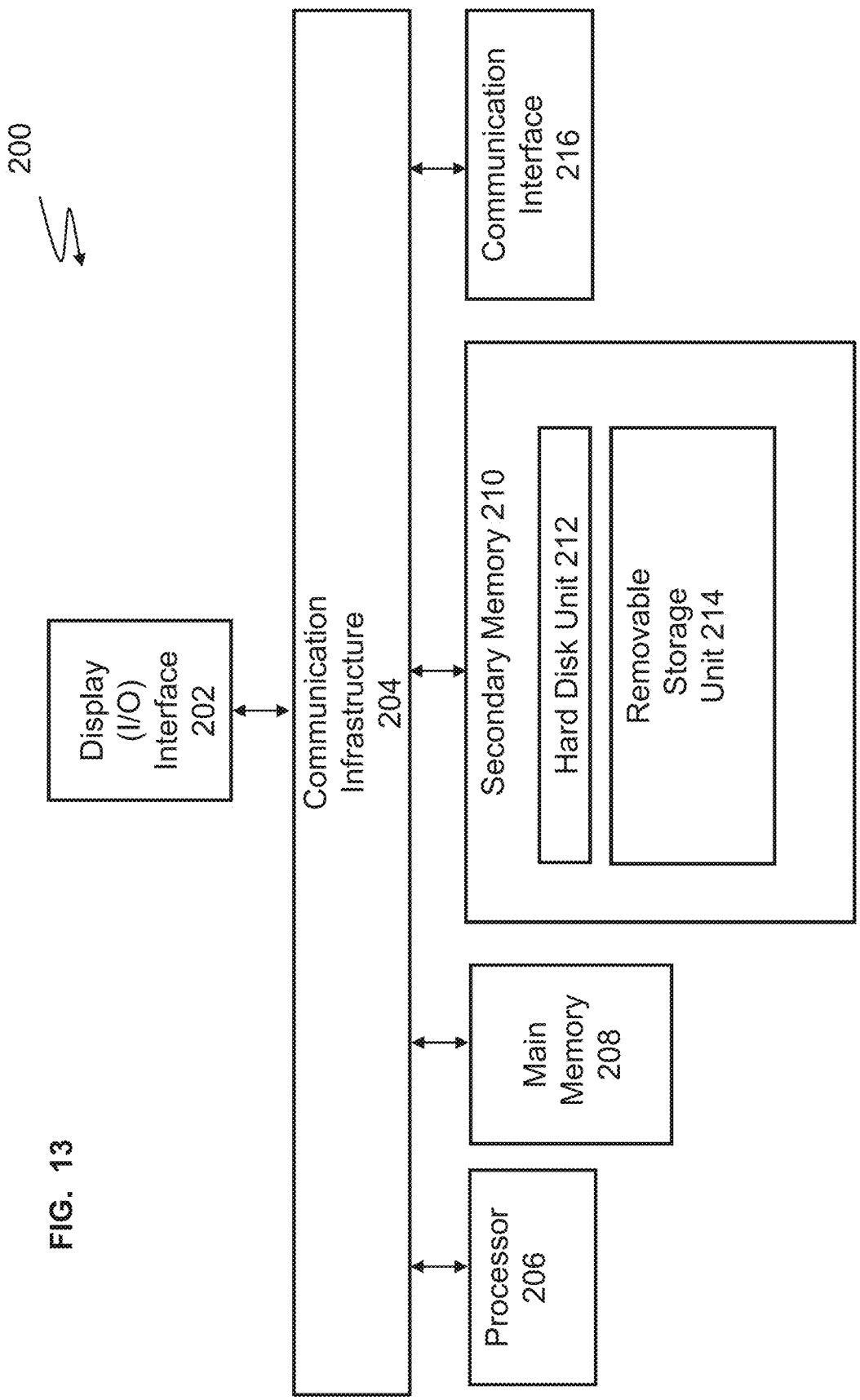
FIG. 13 illustrates an exemplary computer system.

FIG. 13 illustrates an exemplary computer system 200 that may be used to implement the methods according to the invention. One or more computer systems 200 may carry out the methods presented herein as computer code.

Computer system 200 includes an input/output display interface 202 connected to communication infrastructure 204—such as a bus—, which forwards data such as graphics, text, and information, from the communication infrastructure 204 or from a frame buffer (not shown) to other components of the computer system 200. The input/output display interface 202 may be, for example, a keyboard, joystick, trackball, mouse, speaker, a display unit 99 such as a touchscreen or monitor, printer, any other computer peripheral device, or any combination thereof, capable of entering and/or viewing data.

Computer system 200 includes one or more processors 206, which may be a special purpose or a general-purpose digital signal processor that processes certain information. Computer system 200 also includes a main memory 208, for example random access memory ("RAM"), read-only memory ("ROM"), mass storage device, or any combination thereof. Computer system 200 may also include a secondary memory 210 such as a hard disk unit 212, a removable storage unit 214, or any combination thereof. Computer system 200 may also include a communication interface 216, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 208, secondary memory 210, communication interface 216, or a combination thereof, function as a computer usable storage medium, otherwise referred to as a computer readable storage medium, to store and/or access computer software including computer instructions. For purposes of this application, a "computer readable storage medium" includes all non-transitory computer readable media. For example, computer programs or other instructions may be loaded into the computer system 200 such as through a removable storage device, for example, a floppy disk, ZIP disks, magnetic tape, portable flash drive, optical disk such as a CD or DVD or Blu-ray, Micro-Electro-Mechanical Systems ("MEMS"), nanotechnological apparatus. Specifically, computer software including computer instructions may be transferred from the removable storage unit 214 or hard disc unit 212 to the secondary memory 210 or through the communication infrastructure 204 to the main memory 208 of the computer system 200.

Communication interface 216 allows software, instructions and data to be transferred between the computer system 200 and external devices or external networks. Software, instructions, and/or data transferred by the communication interface 216 are typically in the form of signals that may be electronic, electromagnetic, optical or other signals capable of being sent and received by the communication interface 216. Signals may be sent and received using wire or cable, fiber optics, a phone line, a cellular phone link, a Radio Frequency ("RF") link, wireless link, or other communication channels.

Computer programs, when executed, enable the computer system 200, particularly the processor 206, to implement the methods of the invention according to computer software including instructions.

The computer system 200 described herein may perform any one of, or any combination of, the steps of any of the methods presented herein. It is also contemplated that the methods according to the invention may be performed automatically, or may be invoked by some form of manual intervention.

The computer system 200 of FIG. 13 is provided only for purposes of illustration, such that the invention is not limited to this specific embodiment. It is appreciated that a person skilled in the relevant art knows how to program and implement the invention using any computer system.

The computer system 200 may be a handheld device and include any small-sized computer device including, for example, a personal digital assistant ("PDA"), smart handheld computing device, cellular telephone, or a laptop or netbook computer, hand held console or MP3 player, tablet, or similar hand held computer device, such as an iPad®, iPod Touch® or iPhone®.

Figure 14:
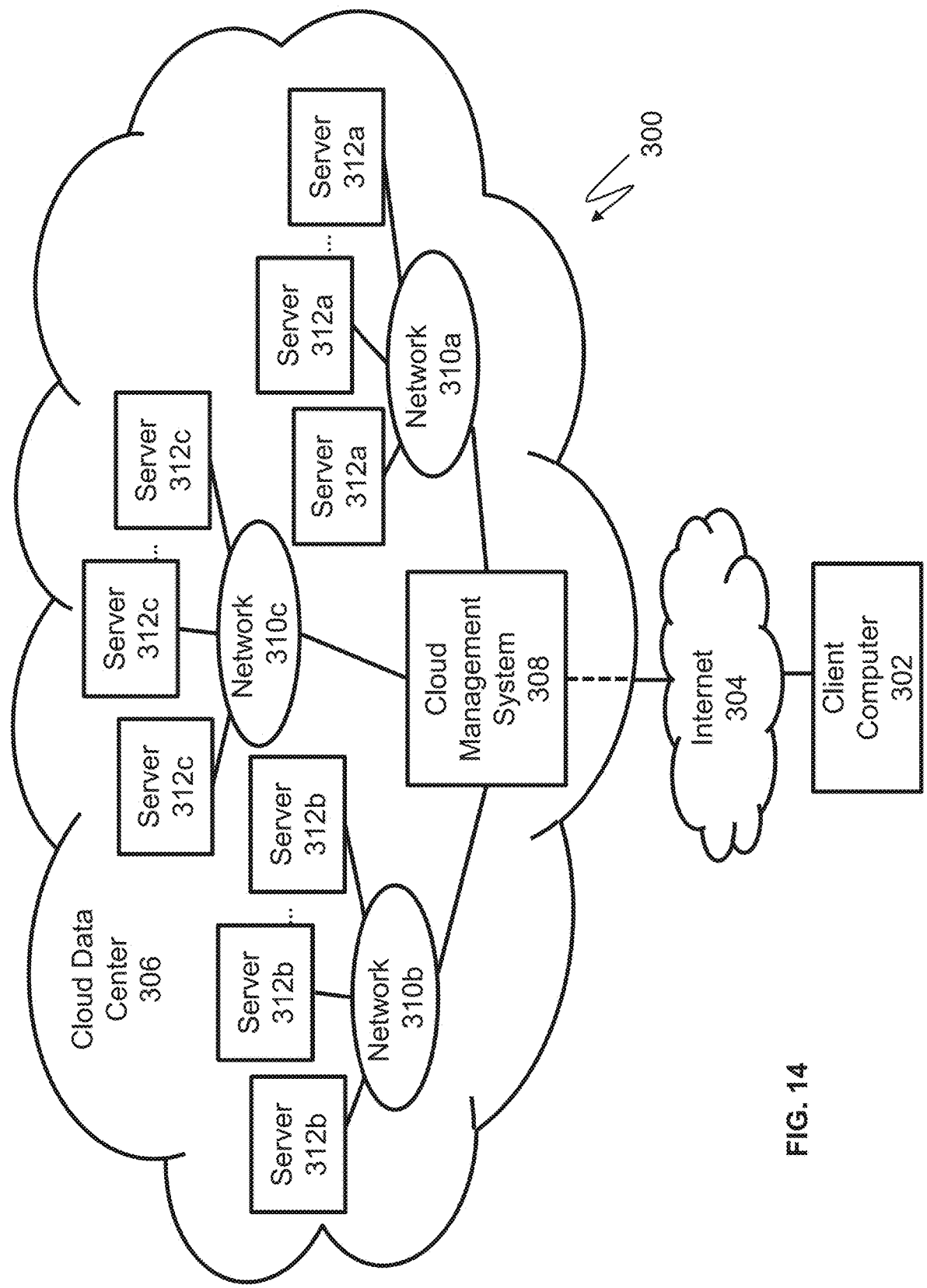
FIG. 14 illustrates an exemplary cloud computing system.

FIG. 14 illustrates an exemplary cloud computing system 300 that may be used to implement the methods according to the present invention. The cloud computing system 300 includes a plurality of interconnected computing environments. The cloud computing system 300 utilizes the resources from various networks as a collective virtual computer, where the services and applications can run independently from a particular computer or server configuration making hardware less important.

Specifically, the cloud computing system 300 includes at least one client computer 302 such as a computer system 200. The client computer 302 may be any device through the use of which a distributed computing environment may be accessed to perform the methods disclosed herein, for example, a traditional computer, portable computer, mobile phone, personal digital assistant, tablet to name a few. The client computer 302 includes memory such as random access memory ("RAM"), read-only memory ("ROM"), mass storage device, or any combination thereof. The memory functions as a computer usable storage medium, otherwise referred to as a computer readable storage medium, to store and/or access computer software and/or instructions.

The client computer 302 also includes a communications interface, for example, a modem, a network interface (such as an Ethernet card), a communications port, a PCMCIA slot and card, wired or wireless systems, etc. The communications interface allows communication through transferred signals between the client computer 302 and external devices including networks such as the Internet 304 and cloud data center 306. Communication may be implemented using wireless or wired capability such as cable, fiber optics, a phone line, a cellular phone link, radio waves or other communication channels.

The client computer 302 establishes communication with the Internet 304—specifically to one or more servers—to, in turn, establish communication with one or more cloud data centers 306. A cloud data center 306 includes one or more networks 310a, 310b, 310c managed through a cloud management system 308. Each network 310a, 310b, 310c includes resource servers 312a, 312b, 312c, respectively. Servers 312a, 312b, 312c permit access to a collection of computing resources and components that can be invoked to instantiate a virtual machine, process, or other resource for a limited or defined duration. For example, one group of resource servers can host and serve an operating system or components thereof to deliver and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software.

The cloud management system 308 can comprise a dedicated or centralized server and/or other software, hardware, and network tools to communicate with one or more networks 310a, 310b, 310c, such as the Internet or other public or private network, with all sets of resource servers 312a, 312b, 312c. The cloud management system 308 may be configured to query and identify the computing resources and components managed by the set of resource servers 312a, 312b, 312c needed and available for use in the cloud data center 306. Specifically, the cloud management system 308 may be configured to identify the hardware resources and components such as type and amount of processing power, type and amount of memory, type and amount of storage, type and amount of network bandwidth and the like, of the set of resource servers 312a, 312b, 312c needed and available for use in the cloud data center 306. Likewise, the cloud management system 308 can be configured to identify the software resources and components, such as type of Operating System ("OS"), application programs, and the like, of the set of resource servers 312a, 312b, 312c needed and available for use in the cloud data center 306.

The present invention is also directed to computer products, otherwise referred to as computer program products, to provide software to the cloud computing system 300. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems ("MEMS"), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 300 of FIG. 14 is provided only for purposes of illustration and does not limit the invention to this specific embodiment. It is appreciated that a person skilled in the relevant art knows how to program and implement the invention using any computer system or network architecture.

The described embodiments are to be considered in all respects only as illustrative and not restrictive, and the scope of the invention is not limited to the foregoing description. Those of skill in the art may recognize changes, substitutions, adaptations and other modifications that may nonetheless come within the scope of the invention and range of the invention.

What is claimed is:

1. A method for classifying textual opinion information as truthful or deceptive, comprising the steps of:
communicating with a processor a first source of opinion information via a communication interface connecting a user system to a network to collect opinion information, wherein the opinion information consists of at least one set of known deceptive opinion information and at least one set of known truthful opinion information forming an initial dataset, the communication interface being a wired communication interface or a wireless communication interface;
storing by the processor the opinion information in a main memory of the user system;
analyzing separately by the processor each of the set of known deceptive opinion information and the set of known truthful opinion information of the opinion information to determine features associated with each set in the initial dataset, wherein the machine-analysis comprises a genre identification approach that reviews each part of speech of the opinion information;
automatically generating a model based on the analyzing step in which a first set of features comprising nouns, adjectives, prepositions, determiners, coordinating conjunctions are associated with the set of known deceptive opinion information and a second set of features comprising verbs, adverbs, pronouns and pre-determiners are associated with the set of known truthful opinion information;
receiving by the processor an online review of a product or a service;
applying by the processor the model to the online review, wherein the processor identifies text of the online review as one or more nouns, adjectives, prepositions, determiners, coordinating conjunctions, verbs, adverbs, pronouns and pre-determiners;
calculating by the processor a first number of features of the first set in the text and a second number of features of the second set in the text; and
categorizing by the processor the online review as deceptive when the first number is greater than the second number and categorizing the online review as truthful when the second number is greater than the first number.

2. The method of claim 1 further comprising the step of:
displaying on a display device a label of one or more online reviews.

3. The method of claim 2, wherein the label is the word "deceptive".

4. The method of claim 2, wherein the label is the word "truthful".

5. The method of claim 3 further comprising the step of:
removing by the processor the one or more online reviews labeled as "deceptive".

6. The method of claim 1 further comprising:
displaying on a display device statistics about prevalence of deceptive opinion information.

* * * * *